(12) United States Patent
Magpayo et al.

(10) Patent No.: US 9,159,084 B2
(45) Date of Patent: Oct. 13, 2015

(54) SYSTEMS AND METHODS TO COMMUNICATION VIA A MERCHANT AGGREGATOR

(71) Applicant: Visa International Service Association, San Francisco, CA (US)

(72) Inventors: Christopher George Magpayo, Belmont, CA (US); Michael Steven Bankston, Pacifica, CA (US); Ryan Hagey, Alameda, CA (US)

(73) Assignee: VISA International Service Association, San Francisco, CA (US)

( * ) Notice: Subject to any disclaimer, the term of this patent is extended or adjusted under 35 U.S.C. 154(b) by 238 days.

(21) Appl. No.: 13/624,778

(22) Filed: Sep. 21, 2012

(65) Prior Publication Data
US 2013/0073464 A1    Mar. 21, 2013

Related U.S. Application Data

(60) Provisional application No. 61/537,524, filed on Sep. 21, 2011.

(51) Int. Cl.
*G06Q 40/00* (2012.01)
*G06Q 30/02* (2012.01)

(52) U.S. Cl.
CPC ................................ *G06Q 30/0256* (2013.01)

(58) Field of Classification Search
CPC ....... G06Q 10/00; G06Q 20/00; G06Q 30/00; G06Q 40/00
USPC ...................................... 706/3–44; 705/3–44
See application file for complete search history.

(56) References Cited

U.S. PATENT DOCUMENTS

| | | | | |
|---|---|---|---|---|
| 5,930,830 | A * | 7/1999 | Mendelson et al. | 711/171 |
| 6,868,391 | B1 | 3/2005 | Hultgren | |
| 8,055,581 | B2 * | 11/2011 | Royyuru et al. | 705/39 |
| 8,561,896 | B2 * | 10/2013 | Hammond et al. | 235/383 |
| 8,612,317 | B1 * | 12/2013 | Harman et al. | 705/30 |
| 8,706,557 | B1 * | 4/2014 | Tavares | 705/21 |
| 8,708,233 | B2 * | 4/2014 | Hammond et al. | 235/383 |
| 8,738,418 | B2 * | 5/2014 | Winters | 705/7.29 |
| 8,843,391 | B2 * | 9/2014 | Fordyce et al. | 705/14.1 |
| 2009/0048916 | A1 | 2/2009 | Nuzum et al. | |
| 2011/0087550 | A1 * | 4/2011 | Fordyce et al. | 705/14.65 |
| 2011/0191252 | A1 | 8/2011 | Dai | |
| 2011/0264543 | A1 | 10/2011 | Taveau et al. | |
| 2012/0203663 | A1 | 8/2012 | Sinclair et al. | |
| 2012/0203666 | A1 | 8/2012 | Torossian et al. | |
| 2013/0046635 | A1 | 2/2013 | Grigg et al. | |
| 2013/0066782 | A1 | 3/2013 | Diamond | |
| 2013/0124417 | A1 | 5/2013 | Spears et al. | |
| 2013/0132196 | A1 | 5/2013 | Hurst | |
| 2013/0185166 | A1 | 7/2013 | Larkin | |
| 2013/0211900 | A1 | 8/2013 | Dessert | |
| 2013/0246203 | A1 | 9/2013 | Laracey | |
| 2013/0275303 | A1 | 10/2013 | Fiore et al. | |
| 2013/0290707 | A1 | 10/2013 | Sinclair et al. | |
| 2014/0337205 | A1 | 11/2014 | Tavares | |

\* cited by examiner

*Primary Examiner* — Frantzy Poinvil
(74) *Attorney, Agent, or Firm* — Greenberg Traurig LLP

(57) ABSTRACT

A computing apparatus configured to determine account numbers of account holders, determine merchant identifiers used to identify respective merchants in authorization requests for transactions between the respective merchants and the account holders, monitor transactions processed by a transaction handler to detect first transactions between the merchants and the account holders, and transmit information about each of the first transactions to a remote computing device in real time as the transaction handler processes the authorization of the respective detected transaction.

25 Claims, 10 Drawing Sheets

SYSTEMS AND METHODS TO COMMUNICATION VIA A MERCHANT AGGREGATOR

RELATED APPLICATIONS

The present application claims the benefit of the filing date of Prov. U.S. Pat. App. Ser. No. 61/537,524, filed Sep. 21, 2011 and entitled "Systems and Methods to Communicate via a Merchant Aggregator", the disclosure of which is incorporated herein by reference.

FIELD OF THE TECHNOLOGY

At least some embodiments of the present disclosure relate to the processing of transactions, such as payments made via credit cards, debit cards, prepaid cards, etc., and/or providing information based on the processing of the transaction data.

BACKGROUND

Millions of transactions occur daily through the use of payment cards, such as credit cards, debit cards, prepaid cards, etc. Corresponding records of the transactions are recorded in databases for settlement and financial record keeping (e.g., to meet the requirements of government regulations). Such data can be mined and analyzed for trends, statistics, and other analyses. Sometimes such data are mined for specific advertising goals, such as to provide targeted offers to account holders, as described in PCT Pub. No. WO 2008/067543 A2, published on Jun. 5, 2008 and entitled "Techniques for Targeted Offers."

U.S. Pat. App. Pub. No. 2009/0216579, published on Aug. 27, 2009 and entitled "Tracking Online Advertising using Payment Services," discloses a system in which a payment service identifies the activity of a user using a payment card as corresponding with an offer associated with an online advertisement presented to the user.

U.S. Pat. No. 6,298,330, issued on Oct. 2, 2001 and entitled "Communicating with a Computer Based on the Offline Purchase History of a Particular Consumer," discloses a system in which a targeted advertisement is delivered to a computer in response to receiving an identifier, such as a cookie, corresponding to the computer.

U.S. Pat. No. 7,035,855, issued on Apr. 25, 2006 and entitled "Process and System for Integrating Information from Disparate Databases for Purposes of Predicting Consumer Behavior," discloses a system in which consumer transactional information is used for predicting consumer behavior.

U.S. Pat. No. 6,505,168, issued on Jan. 7, 2003 and entitled "System and Method for Gathering and Standardizing Customer Purchase Information for Target Marketing," discloses a system in which categories and sub-categories are used to organize purchasing information by credit cards, debit cards, checks and the like. The customer purchase information is used to generate customer preference information for making targeted offers.

U.S. Pat. No. 7,444,658, issued on Oct. 28, 2008 and entitled "Method and System to Perform Content Targeting," discloses a system in which advertisements are selected to be sent to users based on a user classification performed using credit card purchasing data.

U.S. Pat. App. Pub. No. 2005/0055275, published on Mar. 10, 2005 and entitled "System and Method for Analyzing Marketing Efforts," discloses a system that evaluates the cause and effect of advertising and marketing programs using card transaction data.

U.S. Pat. App. Pub. No. 2008/0217397, published on Sep. 11, 2008 and entitled "Real-Time Awards Determinations," discloses a system for facilitating transactions with real-time awards determinations for a cardholder, in which the award may be provided to the cardholder as a credit on the cardholder's statement.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Introduction

Figure 1:
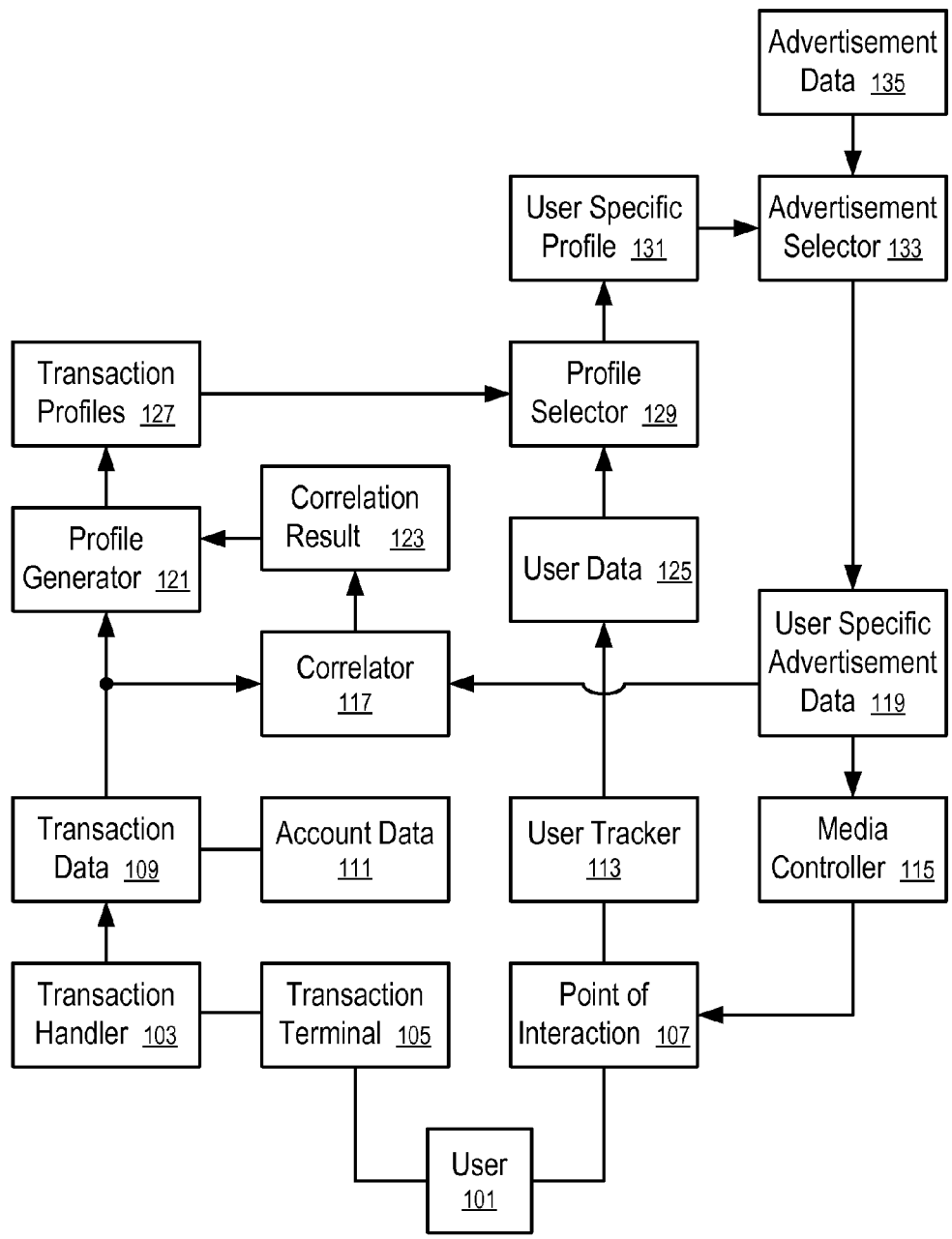
FIG. 1 illustrates a system to provide services based on transaction data according to one embodiment.

In one embodiment, transaction data, such as records of transactions made via credit accounts, debit accounts, prepaid accounts, bank accounts, stored value accounts and the like, is processed to provide information for various services, such as reporting, benchmarking, advertising, content or offer selection, customization, personalization, prioritization, etc. In one embodiment, users are required to enroll in a service program and provide consent to allow the system to use related transaction data and/or other data for the related services. The system is configured to provide the services while protecting the privacy of the users in accordance with the enrollment agreement and user consent.

In one embodiment, an advertising network is provided based on a transaction handler to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers.

The intelligence information can be used to select, identify, generate, adjust, prioritize, and/or personalize advertisements/offers to the customers. In one embodiment, the transaction handler is further automated to process the advertisement fees charged to the advertisers, using the accounts of the advertisers, in response to the advertising activities.

In one embodiment, the computing apparatus is to generate trigger records for a transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions are provided in the section entitled "REAL-TIME MESSAGES."

In one embodiment, the computing apparatus is configured to provide transaction information about transactions between enrolled merchants and enrolled account holders to a merchant aggregator, which enrolls the merchants and account holders for enhanced communications with merchants and account holders. The transaction information is provided in real time or concurrently with the processing of the respective transaction requests at the transaction handler. Details and examples in one embodiment regarding the communication via the merchant aggregator are provided in the section entitled "MERCHANT AGGREGATOR."

In one embodiment, the computing apparatus correlates transactions with activities that occurred outside the context of the transaction, such as online advertisements presented to the customers that at least in part cause offline transactions. The correlation data can be used to demonstrate the success of the advertisements, and/or to improve intelligence information about how individual customers and/or various types or groups of customers respond to the advertisements.

In one embodiment, the computing apparatus correlates, or provides information to facilitate the correlation of, transactions with online activities of the customers, such as searching, web browsing, social networking and consuming advertisements, with other activities, such as watching television programs, and/or with events, such as meetings, announcements, natural disasters, accidents, news announcements, etc.

In one embodiment, the correlation results are used in predictive models to predict transactions and/or spending patterns based on activities or events, to predict activities or events based on transactions or spending patterns, to provide alerts or reports, etc.

In one embodiment, a single entity operating the transaction handler performs various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.

System

FIG. 1 illustrates a system to provide services based on transaction data according to one embodiment. In FIG. 1, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In one embodiment, the system further includes a correlator (117) to correlate user specific advertisement data (119) with transactions resulting from the user specific advertisement data (119). The correlation results (123) can be used by the profile generator (121) to improve the transaction profiles (127).

Figure 2:
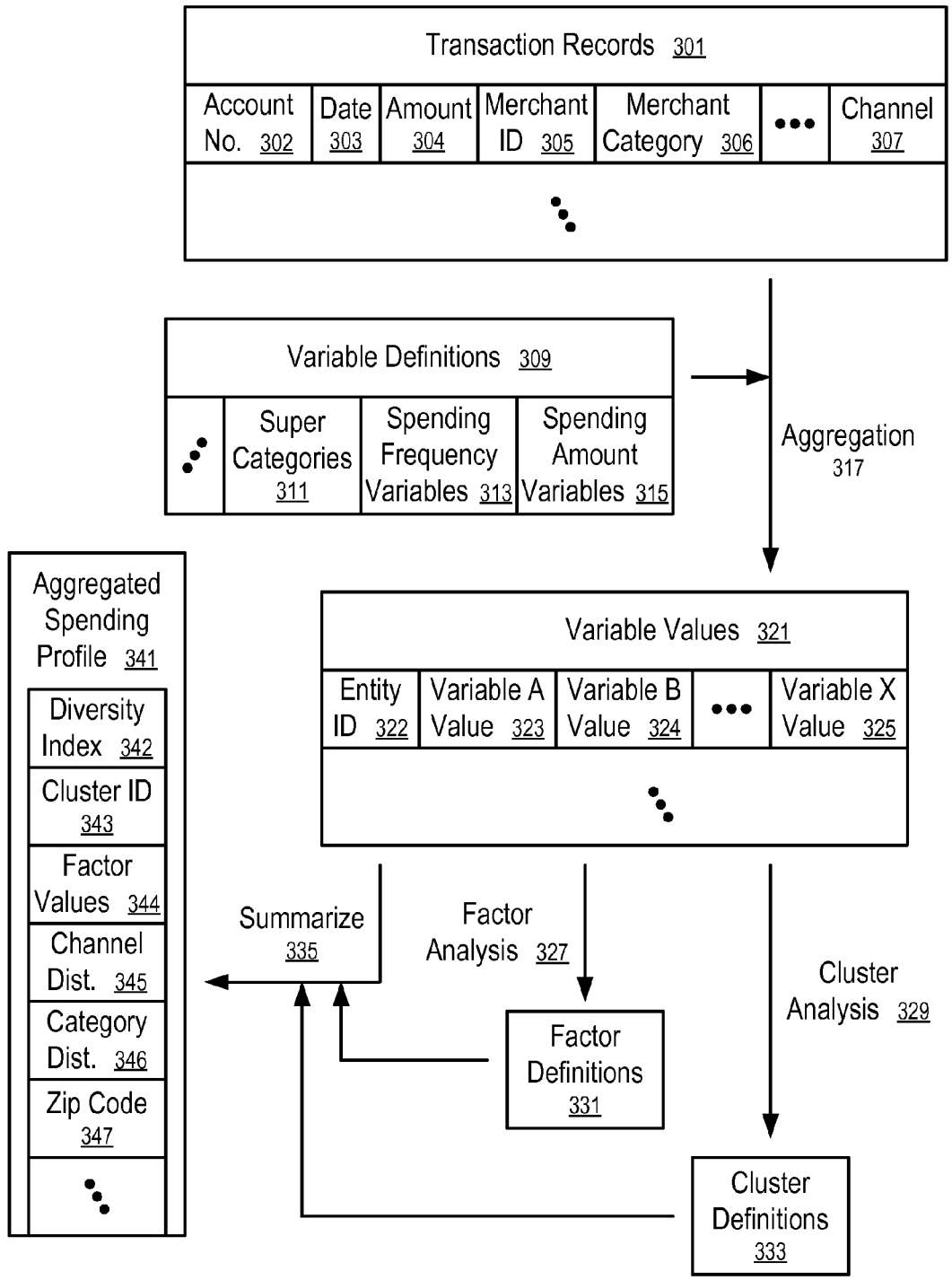
FIG. 2 illustrates the generation of an aggregated spending profile according to one embodiment.
Figure 3:
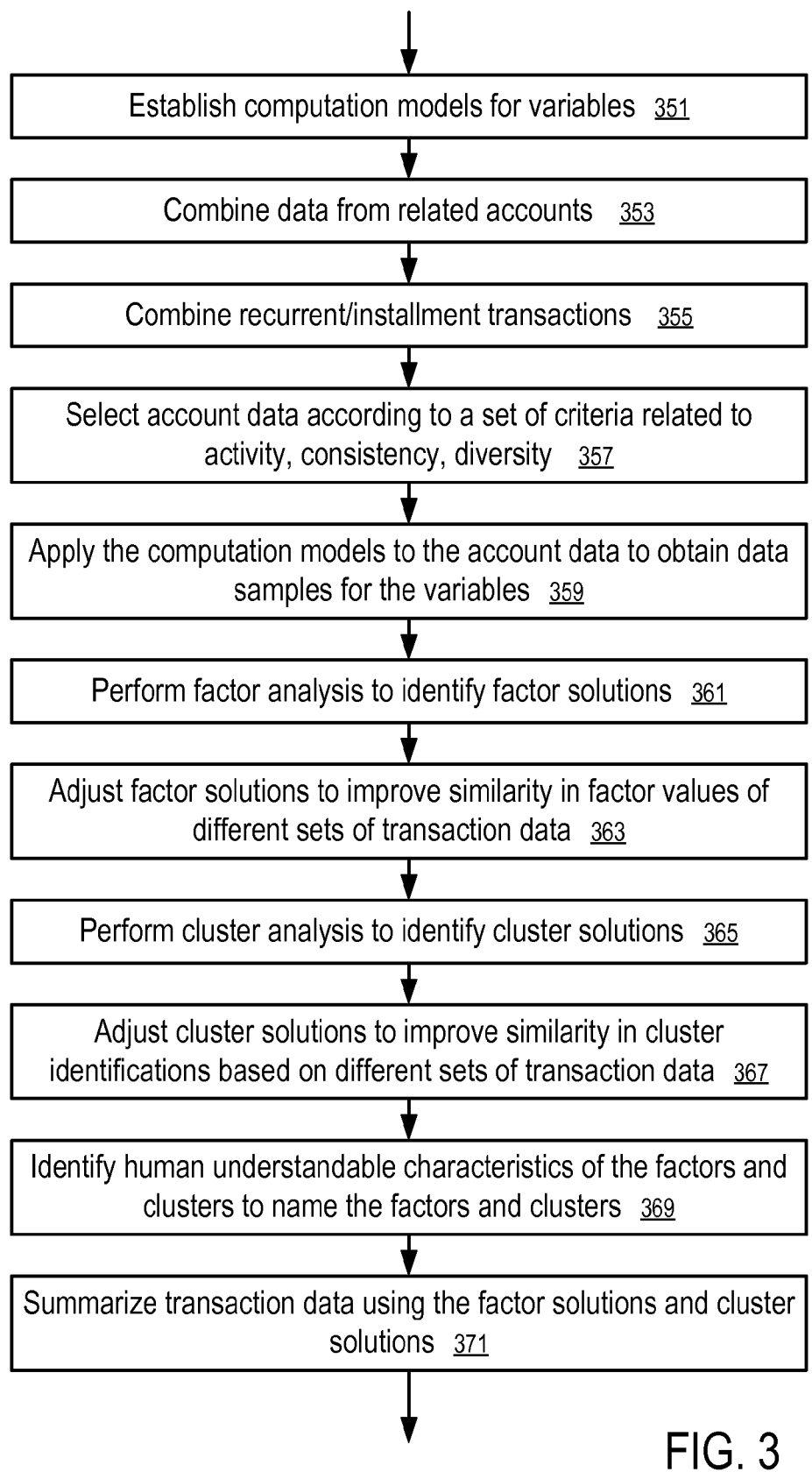
FIG. 3 shows a method to generate an aggregated spending profile according to one embodiment.

In one embodiment, the transaction profiles (127) are generated from the transaction data (109) in a way as illustrated in FIGS. 2 and 3. For example, in FIG. 3, an aggregated spending profile (341) is generated via the factor analysis (327) and cluster analysis (329) to summarize (335) the spending patterns/behaviors reflected in the transaction records (301).

Figure 4:
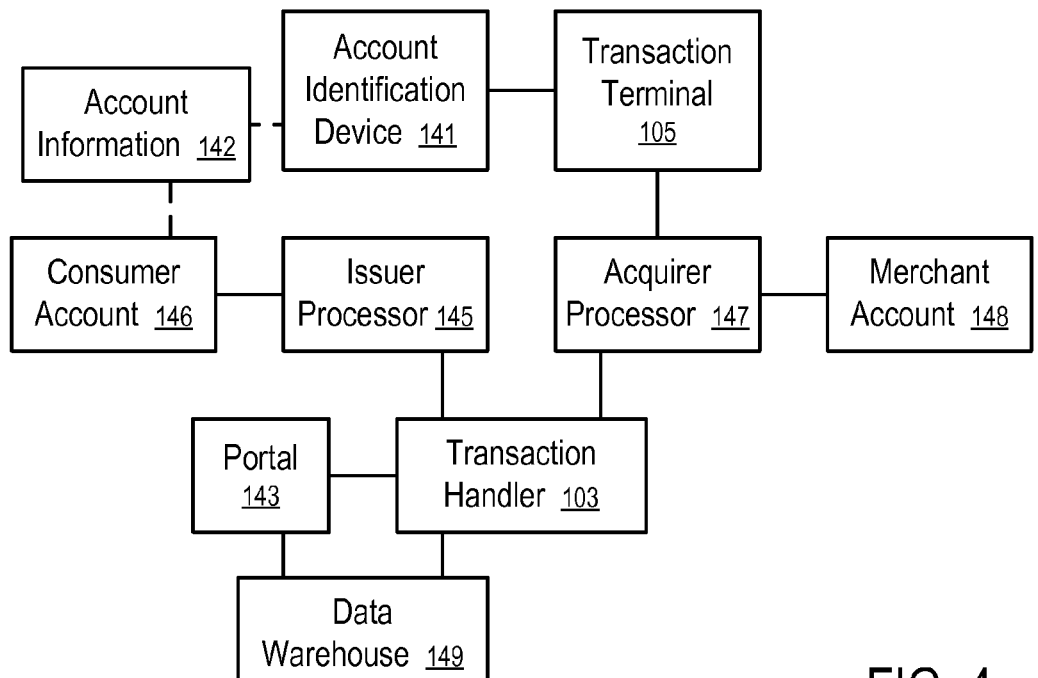
FIG. 4 shows a system to provide information based on transaction data according to one embodiment.

In one embodiment, a data warehouse (149) as illustrated in FIG. 4 is coupled with the transaction handler (103) to store the transaction data (109) and other data, such as account data (111), transaction profiles (127) and correlation results (123). In FIG. 4, a portal (143) is coupled with the data warehouse (149) to provide data or information derived from the transaction data (109), in response to a query request from a third party or as an alert or notification message.

In FIG. 4, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 5:
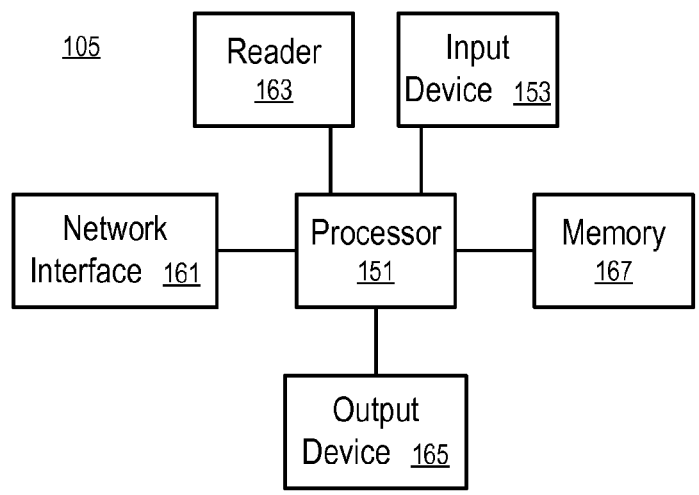
FIG. 5 illustrates a transaction terminal according to one embodiment.
Figure 6:
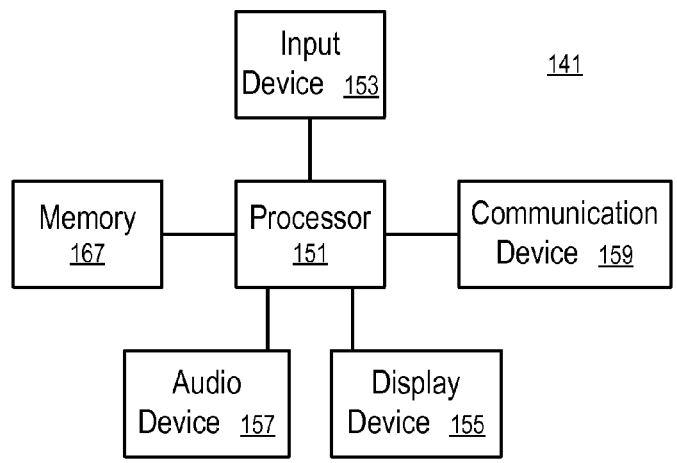
FIG. 6 illustrates an account identifying device according to one embodiment.
Figure 7:
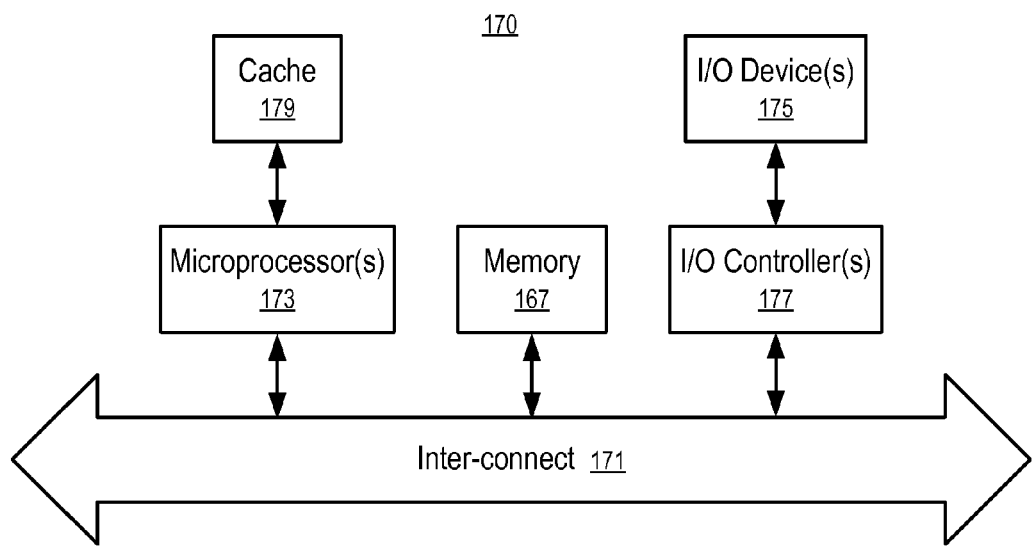
FIG. 7 illustrates a data processing system according to one embodiment.

FIGS. 5 and 6 illustrate examples of transaction terminals (105) and account identification devices (141). FIG. 7 illustrates the structure of a data processing system that can be used to implement, with more or fewer elements, at least some of the components in the system, such as the point of interaction (107), the transaction handler (103), the portal (143), the data warehouse (149), the account identification device (141), the transaction terminal (105), the user tracker (113), the profile generator (121), the profile selector (129), the advertisement selector (133), the media controller (115), etc. Some embodiments use more or fewer components than those illustrated in FIGS. 1 and 4-7, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) maintains a centralized data warehouse (149) organized around the transaction data (109). For example, the centralized data warehouse (149) may include, and/or support the determination of, spending band distribution, transaction count and amount, merchant categories, merchant by state, cardholder segmentation by velocity scores, and spending within merchant target, competitive set and cross-section.

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 1, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. patent application Ser. No. 12/614,603, filed Nov. 9, 2009, published as U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) provides at least part of the intelligence for the prioritization, generation, selection, customization and/or adjustment of an advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

In one embodiment, the profile generator (121) generates and updates the transaction profiles (127) in batch mode periodically. In other embodiments, the profile generator (121) generates the transaction profiles (127) in real-time, or just in time, in response to a request received in the portal (143) for such profiles.

In one embodiment, the transaction profiles (127) include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

Non-Transactional Data

In one embodiment, the transaction data (109) is analyzed in connection with non-transactional data to generate transaction profiles (127) and/or to make predictive models.

In one embodiment, transactions are correlated with non-transactional events, such as news, conferences, shows, announcements, market changes, natural disasters, etc. to establish cause and effect relationships to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

In one embodiment, when the cause and effect relationships between the transactions and non-transactional events are known (e.g., based on prior research results, domain knowledge, expertise), the relationships can be used in predictive models to predict future transactions or spending patterns, based on events that occurred recently or are happening in real-time.

In one embodiment, the non-transactional data relates to events that happened in a geographical area local to the user (101) that performed the respective transactions. In one embodiment, a geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Examples of analyses of local non-transactional data in connection with transaction data (109) in one embodiment are provided in U.S. patent application Ser. No. 12/614,603, filed Nov. 9, 2009, published as U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records (301) are analyzed in frequency domain to identify periodic features in spending events. The periodic features in the past transaction records (301) can be used to predict the probability of a time window in which a similar transaction will occur. For example, the analysis of the transaction data (109) can be used to predict when a next transaction having the periodic feature will occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in U.S. patent application Ser. No. 12/773,770, filed May 4, 2010, published as 2010/0280882, and entitled "Frequency-Based Transaction Prediction and Processing," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user (101) to obtain in-person services. In one embodiment, the offers are selected based on transaction history and shopping patterns in the transaction data (109) and/or the distance between the user (101) and the merchant. In one embodiment, offers are provided in response to a request from the user (101), or in response to a detection of the location of the user (101). Examples and details of at least one embodiment are provided in U.S. patent application Ser. No. 11/767,218, filed Jun. 22, 2007, assigned Pub. No. 2008/0319843, and entitled "Supply of Requested Offer Based on Point-of Service to Offeree Distance," U.S. patent application Ser. No. 11/755,575, filed May 30, 2007, assigned Pub. No. 2008/0300973, and entitled "Supply of Requested Offer Based on Offeree Transaction History," U.S. patent application Ser. No. 11/855,042, filed Sep. 13, 2007, assigned Pub. No. 2009/0076896, and entitled "Merchant Supplied Offer to a Consumer within a Predetermined Distance," U.S. patent application Ser. No. 11/855,069, filed Sep. 13, 2007, assigned Pub. No. 2009/0076925, and entitled "Offeree Requested Offer Based on Point-of Service to Offeree Distance," and U.S. patent application Ser. No. 12/428,302, filed Apr. 22, 2009, assigned Pub. No. 2010/0274627, and entitled "Receiving an Announcement Triggered by Location Data," the disclosures of which applications are hereby incorporated herein by reference.

Targeting Advertisement

In FIG. 1, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregated spending profile (341). As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist in the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile (341) is used to provide intelligence information about the spending patterns, preferences, and/or trends of the user (101). For example, a predictive model can be established based on the aggregated spending profile (341) to estimate the needs of the user (101). For example, the factor values (344) and/or the cluster ID (343) in the aggregated spending profile (341) can be used to determine the spending preferences of the user (101). For example, the channel distribution (345) in the aggregated spending profile (341) can be used to provide a customized offer targeted for a particular channel, based on the spending patterns of the user (101).

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. patent application Ser. No. 11/960,162, filed Dec. 19, 2007, assigned Pub. No. 2008/0201226, and entitled "Mobile Coupon Method and Portable Consumer Device for Utilizing same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in U.S. patent application Ser. No. 11/862, 487, filed Sep. 27, 2007 and entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. patent application Ser. No. 12/185, 332, filed Aug. 4, 2008, assigned Pub. No. 2010/0030644, and entitled "Targeted Advertising by Payment Processor History of Cashless Acquired Merchant Transaction on Issued Consumer Account," and in U.S. patent application Ser. No. 12/849,793, filed Aug. 3, 2010, assigned Pub. No. 2011/0035280, and entitled "Systems and Methods for Targeted Advertisement Delivery," the disclosures of which applications are hereby incorporated herein by reference.

Profile Matching

In FIG. 1, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) for a particular user or group of users that best matches the set of characteristics specified by the user data (125).

In one embodiment, the profile selector (129) receives the transaction profiles (127) in a batch mode. The profile selector (129) selects the user specific profile (131) from the batch of transaction profiles (127) based on the user data (125). Alternatively, the profile generator (121) generates the transaction profiles (127) in real-time; and the profile selector (129) uses the user data (125) to query the profile generator (121) to generate the user specific profile (131) in real-time, or just in time. The profile generator (121) generates the user specific profile (131) that best matches the user data (125).

In one embodiment, the user tracker (113) identifies the user (101) based on the user's activity on the transaction terminal (105) (e.g., having visited a set of websites, currently visiting a type of web pages, search behavior, etc.).

In one embodiment, the user data (125) includes an identifier of the user (101), such as a global unique identifier (GUID), a personal account number (PAN) (e.g., credit card number, debit card number, or other card account number), or other identifiers that uniquely and persistently identify the user (101) within a set of identifiers of the same type. Alternatively, the user data (125) may include other identifiers, such as an Internet Protocol (IP) address of the user (101), a name or user name of the user (101), or a browser cookie ID, which identify the user (101) in a local, temporary, transient and/or anonymous manner. Some of these identifiers of the user (101) may be provided by publishers, advertisers, ad networks, search engines, merchants, or the user tracker (113). In one embodiment, such identifiers are correlated to the user (101) based on the overlapping or proximity of the time period of their usage to establish an identification reference table.

In one embodiment, the identification reference table is used to identify the account information (142) (e.g., account number (302)) based on characteristics of the user (101) captured in the user data (125), such as browser cookie ID, IP addresses, and/or timestamps on the usage of the IP addresses. In one embodiment, the identification reference table is maintained by the operator of the transaction handler (103). Alternatively, the identification reference table is maintained by an entity other than the operator of the transaction handler (103).

In one embodiment, the user tracker (113) determines certain characteristics of the user (101) to describe a type or group of users of which the user (101) is a member. The transaction profile of the group is used as the user specific profile (131). Examples of such characteristics include geographical location or neighborhood, types of online activities, specific online activities, or merchant propensity. In one embodiment, the groups are defined based on aggregate information (e.g., by time of day, or household), or segment (e.g., by cluster, propensity, demographics, cluster IDs, and/or factor values). In one embodiment, the groups are defined in part via one or more social networks. For example, a group may be defined based on social distances to one or more users on a social network website, interactions between users on a social network website, and/or common data in social network profiles of the users in the social network website.

In one embodiment, the user data (125) may match different profiles at a different granularity or resolution (e.g., account, user, family, company, neighborhood, etc.), with different degrees of certainty. The profile selector (129) and/or the profile generator (121) may determine or select the user specific profile (131) with the finest granularity or resolution with acceptable certainty. Thus, the user specific profile (131) is most specific or closely related to the user (101).

In one embodiment, the advertisement selector (133) uses further data in prioritizing, selecting, generating, customizing and adjusting the user specific advertisement data (119). For example, the advertisement selector (133) may use search data in combination with the user specific profile (131) to provide benefits or offers to a user (101) at the point of interaction (107). For example, the user specific profile (131) can be used to personalize the advertisement, such as adjusting the placement of the advertisement relative to other advertisements, adjusting the appearance of the advertisement, etc.

Browser Cookie

In one embodiment, the user data (125) uses browser cookie information to identify the user (101). The browser cookie information is matched to account information (142) or the account number (302) to identify the user specific profile (131), such as aggregated spending profile (341), to present effective, timely, and relevant marketing information to the user (101) via the preferred communication channel (e.g., mobile communications, web, mail, email, point-of-sale (POS) terminal, etc.) within a window of time that could influence the spending behavior of the user (101). Based on the transaction data (109), the user specific profile (131) can improve audience targeting for online advertising. Thus, customers will get better advertisements and offers presented to them; and the advertisers will achieve better return-on-investment for their advertisement campaigns.

In one embodiment, the browser cookie that identifies the user (101) in online activities, such as web browsing, online searching, and using social networking applications, can be matched to an identifier of the user (101) in account data (111), such as the account number (302) of a financial payment card of the user (101) or the account information (142) of the account identification device (141) of the user (101). In one embodiment, the identifier of the user (101) can be uniquely identified via matching IP address, timestamp, cookie ID and/or other user data (125) observed by the user tracker (113).

In one embodiment, a look up table is used to map browser cookie information (e.g., IP address, timestamp, cookie ID) to the account data (111) that identifies the user (101) in the transaction handler (103). The look up table may be established via correlating overlapping or common portions of the user data (125) observed by different entities or different user trackers (113).

For example, in one embodiment, a first user tracker (113) observes the card number of the user (101) at a particular IP address for a time period identified by a timestamp (e.g., via an online payment process); and a second user tracker (113) observes the user (101) having a cookie ID at the same IP address for a time period near or overlapping with the time period observed by the first user tracker (113). Thus, the cookie ID as observed by the second user tracker (113) can be linked to the card number of the user (101) as observed by the first user tracker (113). The first user tracker (113) may be operated by the same entity operating the transaction handler (103) or by a different entity. Once the correlation between the cookie ID and the card number is established via a database or a look up table, the cookie ID can be subsequently used to identify the card number of the user (101) and the account data (111).

In one embodiment, the portal (143) is configured to observe a card number of a user (101) while the user (101) uses an IP address to make an online transaction. Thus, the portal (143) can identify a consumer account (146) based on correlating an IP address used to identify the user (101) and IP addresses recorded in association with the consumer account (146).

For example, in one embodiment, when the user (101) makes a payment online by submitting the account information (142) to the transaction terminal (105) (e.g., an online store), the transaction handler (103) obtains the IP address from the transaction terminal (105) via the acquirer processor (147). The transaction handler (103) stores data to indicate the use of the account information (142) at the IP address at the time of the transaction request. When an IP address in the query received in the portal (143) matches the IP address previously recorded by the transaction handler (103), the portal (143) determines that the user (101) identified by the IP address in the request is the same user (101) associated with the account used in the transaction initiated at the IP address. In one embodiment, a match is found when the time of the query request is within a predetermined time period from the transaction request, such as a few minutes, one hour, a day, etc. In one embodiment, the query may also include a cookie ID representing the user (101). Thus, through matching the IP address, the cookie ID is associated with the account information (142) in a persistent way.

In one embodiment, the portal (143) obtains the IP address of the online transaction directly. For example, in one embodiment, a user (101) chooses to use a password in the account data (111) to protect the account information (142) for online transactions. When the account information (142) is entered into the transaction terminal (105) (e.g., an online store or an online shopping cart system), the user (101) is connected to the portal (143) for the verification of the password (e.g., via a pop up window, or via redirecting the web browser of the user (101)). The transaction handler (103) accepts the transaction request after the password is verified via the portal (143). Through this verification process, the portal (143) and/or the transaction handler (103) obtain the IP address of the user (101) at the time the account information (142) is used.

In one embodiment, the web browser of the user (101) communicates the user-provided password to the portal (143) directly without going through the transaction terminal (105) (e.g., the server of the merchant). Alternatively, the transaction terminal (105) and/or the acquirer processor (147) may relay the password communication to the portal (143) or the transaction handler (103).

In one embodiment, the portal (143) is configured to identify the consumer account (146) based on the IP address identified in the user data (125) through mapping the IP address to a street address. For example, in one embodiment, the user data (125) includes an IP address to identify the user (101); and the portal (143) can use a service to map the IP address to a street address. For example, an Internet service provider knows the street address of the currently assigned IP address. Once the street address is identified, the portal (143) can use the account data (111) to identify the consumer account (146) that has a current address at the identified street address. Once the consumer account (146) is identified, the portal (143) can provide a transaction profile (131) specific to the consumer account (146) of the user (101).

In one embodiment, the portal (143) uses a plurality of methods to identify consumer accounts (146) based on the user data (125). The portal (143) combines the results from the different methods to determine the most likely consumer account (146) for the user data (125).

Details about the identification of consumer account (146) based on user data (125) in one embodiment are provided in U.S. patent application Ser. No. 12/849,798, filed Aug. 3, 2010, published as U.S. Pat. App. Pub. No. 2011/0093327, and entitled "Systems and Methods to Match Identifiers," the disclosure of which is hereby incorporated herein by reference.

Close the Loop

In one embodiment, the correlator (117) is used to "close the loop" for the tracking of consumer behavior across an on-line activity and an "off-line" activity that results at least in part from the on-line activity. In one embodiment, online activities, such as searching, web browsing, social networking, and/or consuming online advertisements, are correlated with respective transactions to generate the correlation result (123) in FIG. 1. The respective transactions may occur offline, in "brick and mortar" retail stores, or online but in a context outside the online activities, such as a credit card purchase that is performed in a way not visible to a search company that facilitates the search activities.

In one embodiment, the correlator (117) is to identify transactions resulting from searches or online advertisements. For example, in response to a query about the user (101) from the user tracker (113), the correlator (117) identifies an offline transaction performed by the user (101) and sends the correlation result (123) about the offline transaction to the user tracker (113), which allows the user tracker (113) to combine the information about the offline transaction and the online activities to provide significant marketing advantages.

For example, a marketing department could correlate an advertising budget to actual sales. For example, a marketer can use the correlation result (123) to study the effect of certain prioritization strategies, customization schemes, etc. on the impact on the actual sales. For example, the correlation result (123) can be used to adjust or prioritize advertisement placement on a website, a search engine, a social networking site, an online marketplace, or the like.

In one embodiment, the profile generator (121) uses the correlation result (123) to augment the transaction profiles (127) with data indicating the rate of conversion from searches or advertisements to purchase transactions. In one embodiment, the correlation result (123) is used to generate predictive models to determine what a user (101) is likely to purchase when the user (101) is searching using certain keywords or when the user (101) is presented with an advertisement or offer. In one embodiment, the portal (143) is configured to report the correlation result (123) to a partner, such as a search engine, a publisher, or a merchant, to allow the partner to use the correlation result (123) to measure the effectiveness of advertisements and/or search result customization, to arrange rewards, etc.

Illustratively, a search engine entity may display a search page with particular advertisements for flat panel televisions produced by companies A, B, and C. The search engine entity may then compare the particular advertisements presented to a particular consumer with transaction data of that consumer and may determine that the consumer purchased a flat panel television produced by Company B. The search engine entity may then use this information and other information derived from the behavior of other consumers to determine the effectiveness of the advertisements provided by companies A, B, and C. The search engine entity can determine if the placement, appearance, or other characteristic of the advertisement results in actual increased sales. Adjustments to advertisements (e.g., placement, appearance, etc.) may be made to facilitate maximum sales.

In one embodiment, the correlator (117) matches the online activities and the transactions based on matching the user data (125) provided by the user tracker (113) and the records of the transactions, such as transaction data (109) or transaction records (301). In another embodiment, the correlator (117) matches the online activities and the transactions based on the redemption of offers/benefits provided in the user specific advertisement data (119).

In one embodiment, the portal (143) is configured to receive a set of conditions and an identification of the user (101), determine whether there is any transaction of the user (101) that satisfies the set of conditions, and if so, provide indications of the transactions that satisfy the conditions and/or certain details about the transactions, which allows the requester to correlate the transactions with certain user activities, such as searching, web browsing, consuming advertisements, etc.

In one embodiment, the requester may not know the account number (302) of the user (101); and the portal (143) is to map the identifier provided in the request to the account number (302) of the user (101) to provide the requested information. Examples of the identifier being provided in the request to identify the user (101) include an identification of an iFrame of a web page visited by the user (101), a browser cookie ID, an IP address and the day and time corresponding to the use of the IP address, etc.

The information provided by the portal (143) can be used in pre-purchase marketing activities, such as customizing content or offers, prioritizing content or offers, selecting content or offers, etc., based on the spending pattern of the user (101). The content that is customized, prioritized, selected, or recommended may be the search results, blog entries, items for sale, etc.

The information provided by the portal (143) can be used in post-purchase activities. For example, the information can be used to correlate an offline purchase with online activities. For example, the information can be used to determine purchases made in response to media events, such as television programs, advertisements, news announcements, etc.

Details about profile delivery, online activity to offline purchase tracking, techniques to identify the user specific profile (131) based on user data (125) (such as IP addresses), and targeted delivery of advertisement/offer/benefit in some embodiments are provided in U.S. patent application Ser. No. 12/849,789, filed Aug. 3, 2010, published as U.S. Pat. App. Pub. No. 2011/0035278, and entitled "Systems and Methods for Closing the Loop between Online Activities and Offline Purchases," the disclosure of which application is incorporated herein by reference.

Matching Advertisement & Transaction

In one embodiment, the correlator (117) is configured to receive information about the user specific advertisement data (119), monitor the transaction data (109), identify transactions that can be considered results of the advertisement corresponding to the user specific advertisement data (119), and generate the correlation result (123), as illustrated in FIG. 1.

When the advertisement and the corresponding transaction both occur in an online checkout process, a website used for the online checkout process can be used to correlate the transaction and the advertisement. However, the advertisement and the transaction may occur in separate processes and/or under control of different entities (e.g., when the purchase is made offline at a retail store, whereas the advertisement is presented outside the retail store). In one embodiment, the correlator (117) uses a set of correlation criteria to identify the transactions that can be considered as the results of the advertisements.

In one embodiment, the correlator (117) identifies the transactions linked or correlated to the user specific advertisement data (119) based on various criteria. For example, the user specific advertisement data (119) may include a coupon offering a benefit contingent upon a purchase made according to the user specific advertisement data (119). The use of the coupon identifies the user specific advertisement data (119), and thus allows the correlator (117) to correlate the transaction with the user specific advertisement data (119).

In one embodiment, the user specific advertisement data (119) is associated with the identity or characteristics of the user (101), such as global unique identifier (GUID), personal account number (PAN), alias, IP address, name or user name, geographical location or neighborhood, household, user group, and/or user data (125). The correlator (117) can link or match the transactions with the advertisements based on the identity or characteristics of the user (101) associated with the user specific advertisement data (119). For example, the portal (143) may receive a query identifying the user data (125) that tracks the user (101) and/or characteristics of the user specific advertisement data (119); and the correlator (117) identifies one or more transactions matching the user data (125) and/or the characteristics of the user specific advertisement data (119) to generate the correlation result (123).

In one embodiment, the correlator (117) identifies the characteristics of the transactions and uses the characteristics to search for advertisements that match the transactions. Such characteristics may include GUID, PAN, IP address, card number, browser cookie information, coupon, alias, etc.

In FIG. 1, the profile generator (121) uses the correlation result (123) to enhance the transaction profiles (127) generated from the profile generator (121). The correlation result (123) provides details on purchases and/or indicates the effectiveness of the user specific advertisement data (119).

In one embodiment, the correlation result (123) is used to demonstrate to the advertisers the effectiveness of the advertisements, to process incentive or rewards associated with the advertisements, to obtain at least a portion of advertisement revenue based on the effectiveness of the advertisements, to improve the selection of advertisements, etc.

Coupon Matching

In one embodiment, the correlator (117) identifies a transaction that is a result of an advertisement (e.g., 119) when an offer or benefit provided in the advertisement is redeemed via the transaction handler (103) in connection with a purchase identified in the advertisement.

For example, in one embodiment, when the offer is extended to the user (101), information about the offer can be stored in association with the account of the user (101) (e.g., as part of the account data (111)). The user (101) may visit the portal (143) of the transaction handler (103) to view the stored offer.

The offer stored in the account of the user (101) may be redeemed via the transaction handler (103) in various ways. For example, in one embodiment, the correlator (117) may download the offer to the transaction terminal (105) via the transaction handler (103) when the characteristics of the transaction at the transaction terminal (105) match the characteristics of the offer.

After the offer is downloaded to the transaction terminal (105), the transaction terminal (105) automatically applies the offer when the condition of the offer is satisfied in one embodiment. Alternatively, the transaction terminal (105) allows the user (101) to selectively apply the offers downloaded by the correlator (117) or the transaction handler (103). In one embodiment, the correlator (117) sends reminders to the user (101) at a separate point of interaction (107) (e.g., a mobile phone) to remind the user (101) to redeem the offer. In one embodiment, the transaction handler (103) applies the offer (e.g., via statement credit), without having to download the offer (e.g., coupon) to the transaction terminal (105). Examples and details of redeeming offers via statement credit are provided in U.S. patent application Ser. No. 12/566,350, filed Sep. 24, 2009, published as U.S. Pat. App. Pub. No. 2010/0114686, and entitled "Real-Time Statement Credits and Notifications," the disclosure of which is hereby incorporated herein by reference.

In one embodiment, the offer is captured as an image and stored in association with the account of the user (101). Alternatively, the offer is captured in a text format (e.g., a code and a set of criteria), without replicating the original image of the coupon.

In one embodiment, when the coupon is redeemed, the advertisement presenting the coupon is correlated with a transaction in which the coupon is redeemed, and/or is determined to have resulted in a transaction. In one embodiment, the correlator (117) identifies advertisements that have resulted in purchases, without having to identify the specific transactions that correspond to the advertisements.

Details about offer redemption via the transaction handler (103) in one embodiment are provided in U.S. patent application Ser. No. 12/849,801, filed Aug. 3, 2010, published as U.S. Pat. App. Pub. No. 2011/0125565, and entitled "Systems and Methods for Multi-Channel Offer Redemption," the disclosure of which is hereby incorporated herein by reference.

On ATM & POS Terminal

In one example, the transaction terminal (105) is an automatic teller machine (ATM), which is also the point of interaction (107). When the user (101) approaches the ATM to make a transaction (e.g., to withdraw cash via a credit card or debit card), the ATM transmits account information (142) to the transaction handler (103). The account information (142) can also be considered as the user data (125) to select the user specific profile (131). The user specific profile (131) can be sent to an advertisement network to query for a targeted advertisement. After the advertisement network matches the user specific profile (131) with user specific advertisement data (119) (e.g., a targeted advertisement), the transaction handler (103) may send the advertisement to the ATM, together with the authorization for cash withdrawal.

In one embodiment, the advertisement shown on the ATM includes a coupon that offers a benefit that is contingent upon the user (101) making a purchase according to the advertisement. The user (101) may view the offer presented on a white space on the ATM screen and select to load or store the coupon in a storage device of the transaction handler (103) under the account of the user (101). The transaction handler (103) communicates with the bank to process the cash withdrawal. After the cash withdrawal, the ATM prints the receipt, which includes a confirmation of the coupon, or a copy of the coupon. The user (101) may then use the coupon printed on the receipt. Alternatively, when the user (101) uses the same account to make a relevant purchase, the transaction handler (103) may automatically apply the coupon stored under the account of the user (101), automatically download the coupon to the relevant transaction terminal (105), or transmit the coupon to the mobile phone of the user (101) to allow the user (101) to use the coupon via a display of the coupon on the mobile phone. The user (101) may visit a web portal (143) of the transaction handler (103) to view the status of the coupons collected in the account of the user (101).

In one embodiment, the advertisement is forwarded to the ATM via the data stream for authorization. In another embodiment, the ATM makes a separate request to a server of the transaction handler (103) (e.g., a web portal) to obtain the advertisement. Alternatively, or in combination, the advertisement (including the coupon) is provided to the user (101) at separate, different points of interactions, such as via a text message to a mobile phone of the user (101), via an email, via a bank statement, etc.

Details of presenting targeted advertisements on ATMs based on purchasing preferences and location data in one embodiment are provided in U.S. patent application Ser. No. 12/266,352, filed Nov. 6, 2008, published as U.S. Pat. App. Pub. No. 2010/0114677, and entitled "System Including Automated Teller Machine with Data Bearing Medium," the disclosure of which is hereby incorporated herein by reference.

In another example, the transaction terminal (105) is a POS terminal at the checkout station in a retail store (e.g., a self-service checkout register). When the user (101) pays for a purchase via a payment card (e.g., a credit card or a debit card), the transaction handler (103) provides a targeted advertisement having a coupon obtained from an advertisement network. The user (101) may load the coupon into the account of the payment card and/or obtain a hardcopy of the coupon from the receipt. When the coupon is used in a transaction, the advertisement is linked to the transaction.

Details of presenting targeted advertisements during the process of authorizing a financial payment card transaction in one embodiment are provided in U.S. patent application Ser. No. 11/799,549, filed May 1, 2007, assigned Pub. No. 2008/0275771, and entitled "Merchant Transaction Based Advertising," the disclosure of which is hereby incorporated herein by reference.

In one embodiment, the user specific advertisement data (119), such as offers or coupons, is provided to the user (101) via the transaction terminal (105) in connection with an authorization message during the authorization of a transaction processed by the transaction handler (103). The authorization message can be used to communicate the rewards qualified for by the user (101) in response to the current transaction, the status and/or balance of rewards in a loyalty program, etc. Examples and details related to the authorization process in one embodiment are provided in U.S. patent application Ser. No. 11/266,766, filed Nov. 2, 2005, assigned Pub. No. 2007/0100691, and entitled "Method and System for Conducting Promotional Programs," the disclosure of which is hereby incorporated herein by reference.

In one embodiment, when the user (101) is conducting a transaction with a first merchant via the transaction handler (103), the transaction handler (103) may determine whether the characteristics of the transaction satisfy the conditions specified for an announcement, such as an advertisement, offer or coupon, from a second merchant. If the conditions are satisfied, the transaction handler (103) provides the announcement to the user (101). In one embodiment, the transaction handler (103) may auction the opportunity to provide the announcements to a set of merchants. Examples and details related to the delivery of such announcements in one embodiment are provided in U.S. patent application Ser. No. 12/428,241, filed Apr. 22, 2009, published as U.S. Pat. App. Pub. No. 2010/0274625, and entitled "Targeting Merchant Announcements Triggered by Consumer Activity Relative to a Surrogate Merchant," the disclosure of which is hereby incorporated herein by reference.

Details about delivering advertisements at a point of interaction that is associated with user transaction interactions in one embodiment are provided in U.S. patent application Ser. No. 12/849,791, filed Aug. 3, 2010, published as U.S. Pat. App. Pub. No. 2011/0087550, and entitled "Systems and Methods to Deliver Targeted Advertisements to Audience," the disclosure of which is hereby incorporated herein by reference.

On Third Party Site

In a further example, the user (101) may visit a third party website, which is the point of interaction (107) in FIG. 1. The third party website may be a web search engine, a news website, a blog, a social network site, etc. The behavior of the user (101) at the third party website may be tracked via a browser cookie, which uses a storage space of the browser to store information about the user (101) at the third party website. Alternatively, or in combination, the third party website uses the server logs to track the activities of the user (101). In one embodiment, the third party website may allow an advertisement network to present advertisements on portions of the web pages. The advertisement network tracks the user's behavior using its server logs and/or browser cookies. For example, the advertisement network may use a browser cookie to identify a particular user across multiple websites. Based on the referral uniform resource locators (URL) that cause the advertisement network to load advertisements in various web pages, the advertisement network can determine the online behavior of the user (101) via analyzing the web pages that the user (101) has visited. Based on the tracked online activities of the user (101), the user data (125) that characterizes the user (101) can be formed to query the profiler selector (129) for a user specific profile (131).

In one embodiment, the cookie identity of the user (101) as tracked using the cookie can be correlated to an account of the user (101), the family of the user (101), the company of the user (101), or other groups that include the user (101) as a member. Thus, the cookie identity can be used as the user data (125) to obtain the user specific profile (131). For example, when the user (101) makes an online purchase from a web page that contains an advertisement that is tracked with the cookie identity, the cookie identity can be correlated to the online transaction and thus to the account of the user (101). For example, when the user (101) visits a web page after authentication of the user (101), and the web page includes an advertisement from the advertisement network, the cookie identity can be correlated to the authenticated identity of the user (101). For example, when the user (101) signs in to a web portal (e.g., 143) of the transaction handler (103) to access the account of the user (101), the cookie identity used by the advertisement network on the web portal (e.g., 143) can be correlated to the account of the user (101).

Other online tracking techniques can also be used to correlate the cookie identity of the user (101) with an identifier of the user (101) known by the profile selector (129), such as a GUID, PAN, account number, customer number, social security number, etc. Subsequently, the cookie identity can be used to select the user specific profile (131).

Multiple Communications

In one embodiment, the entity operating the transaction handler (103) may provide intelligence for providing multiple communications regarding an advertisement. The multiple communications may be directed to two or more points of interaction with the user (101).

For example, after the user (101) is provided with an advertisement via the transaction terminal (105), reminders or revisions to the advertisements can be sent to the user (101) via a separate point of interaction (107), such as a mobile phone, email, text message, etc. For example, the advertisement may include a coupon to offer the user (101) a benefit contingent upon a purchase. If the correlator (117) determines that the coupon has not been redeemed, the correlator (117) may send a message to the mobile phone of the user (101) to remind the user (101) about the offer, and/or revise the offer.

Examples of multiple communications related to an offer in one embodiment are provided in U.S. patent application Ser. No. 12/510,167, filed Jul. 27, 2009, published as U.S. Pat. App. Pub. No. 2011/0022424, and entitled "Successive Offer Communications with an Offer Recipient," the disclosure of which is hereby incorporated herein by reference.

Auction Engine

In one embodiment, the transaction handler (103) provides a portal (e.g., 143) to allow various clients to place bids according to clusters (e.g., to target entities in the clusters for marketing, monitoring, researching, etc.)

For example, cardholders may register in a program to receive offers, such as promotions, discounts, sweepstakes, reward points, direct mail coupons, email coupons, etc. The cardholders may register with issuers, or with the portal (143) of the transaction handler (103). Based on the transaction data (109) or transaction records (301) and/or the registration data, the profile generator (121) is to identify the clusters of cardholders and the values representing the affinity of the cardholders to the clusters. Various entities may place bids according to the clusters and/or the values to gain access to the cardholders, such as the user (101). For example, an issuer may bid on access to offers; an acquirer and/or a merchant may bid on customer segments. An auction engine receives the bids and awards segments and offers based on the received bids. Thus, customers can get great deals; and merchants can get customer traffic and thus sales.

Some techniques to identify a segment of users (101) for marketing are provided in U.S. patent application Ser. No. 12/288,490, filed Oct. 20, 2008, assigned Pub. No. 2009/0222323, and entitled "Opportunity Segmentation," U.S. patent application Ser. No. 12/108,342, filed Apr. 23, 2008, assigned Pub. No. 2009/0271305, and entitled "Payment Portfolio Optimization," and U.S. patent application Ser. No. 12/108,354, filed Apr. 23, 2008, assigned Pub. No. 2009/0271327, and entitled "Payment Portfolio Optimization," the disclosures of which applications are hereby incorporated herein by reference.

Social Network Validation

In one embodiment, the transaction data (109) is combined with social network data and/or search engine data to provide benefits (e.g., coupons) to a consumer. For example, a data exchange apparatus may identify cluster data based upon consumer search engine data, social network data, and payment transaction data to identify like groups of individuals who would respond favorably to particular types of benefits such as coupons and statement credits. Advertisement campaigns may be formulated to target the cluster of consumers or cardholders.

In one embodiment, search engine data is combined with social network data and/or the transaction data (109) to evaluate the effectiveness of the advertisements and/or conversion pattern of the advertisements. For example, after a search engine displays advertisements about flat panel televisions to a consumer, a social network that is used by a consumer may provide information about a related purchase made by the consumer. For example, the blog of the consumer, and/or the transaction data (109), may indicate that the flat panel television purchased by the consumer is from company B. Thus, the search engine data, the social network data and/or the transaction data (109) can be combined to correlate advertisements to purchases resulting from the advertisements and to determine the conversion pattern of the advertisement presented to the consumer. Adjustments to advertisements (e.g., placement, appearance, etc.) can be made to improve the effectiveness of the advertisements and thus increase sales.

Loyalty Program

In one embodiment, the transaction handler (103) uses the account data (111) to store information for third party loyalty programs. The transaction handler (103) processes payment transactions made via financial transaction cards, such as credit cards, debit cards, banking cards, etc.; and the financial transaction cards can be used as loyalty cards for the respective third party loyalty programs. Since the third party loyalty programs are hosted on the transaction handler (103), the consumers do not have to carry multiple, separate loyalty cards (e.g., one for each merchant that offers a loyalty program); and the merchants do not have to incur a large setup and investment fee to establish the loyalty program. The loyalty programs hosted on the transaction handler (103) can provide flexible awards for consumers, retailers, manufacturers, issuers, and other types of business entities involved in the loyalty programs. The integration of the loyalty programs into the accounts of the customers on the transaction handler (103) allows new offerings, such as merchant cross-offerings or bundling of loyalty offerings.

In one embodiment, an entity operating the transaction handler (103) hosts loyalty programs for third parties using the account data (111) of the users (e.g., 101). A third party, such as a merchant, retailer, manufacturer, issuer or other entity that is interested in promoting certain activities and/or behaviors, may offer loyalty rewards on existing accounts of consumers. The incentives delivered by the loyalty programs can drive behavior changes without the hassle of loyalty card creation. In one embodiment, the loyalty programs hosted via the accounts of the users (e.g., 101) of the transaction handler (103) allow the consumers to carry fewer cards and may provide more data to the merchants than traditional loyalty programs.

The loyalty programs integrated with the accounts of the users (e.g., 101) of the transaction handler (103) can provide tools to enable nimble programs that are better aligned for driving changes in consumer behaviors across transaction channels (e.g., online, offline, via mobile devices). The loyalty programs can be ongoing programs that accumulate benefits for customers (e.g., points, miles, cash back), and/or programs that provide one time benefits or limited time benefits (e.g., rewards, discounts, incentives).

Figure 8:
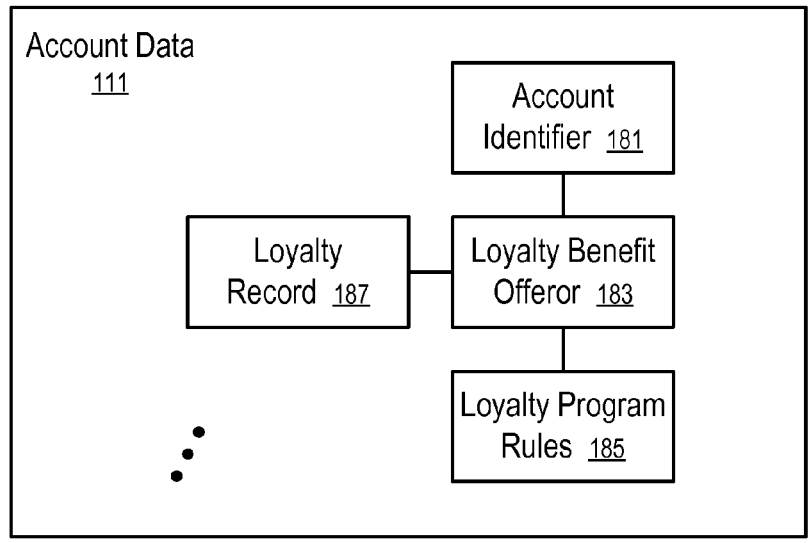
FIG. 8 shows the structure of account data for providing loyalty programs according to one embodiment.

FIG. 8 shows the structure of account data (111) for providing loyalty programs according to one embodiment. In FIG. 8, data related to a third party loyalty program may include an identifier of the loyalty benefit offeror (183) that is linked to a set of loyalty program rules (185) and the loyalty record (187) for the loyalty program activities of the account identifier (181). In one embodiment, at least part of the data related to the third party loyalty program is stored under the account identifier (181) of the user (101), such as the loyalty record (187).

FIG. 8 illustrates the data related to one third party loyalty program of a loyalty benefit offeror (183). In one embodiment, the account identifier (181) may be linked to multiple loyalty benefit offerors (e.g., 183), corresponding to different third party loyalty programs.

In one embodiment, a third party loyalty program of the loyalty benefit offeror (183) provides the user (101), identified by the account identifier (181), with benefits, such as discounts, rewards, incentives, cash back, gifts, coupons, and/or privileges.

In one embodiment, the association between the account identifier (181) and the loyalty benefit offeror (183) in the account data (111) indicates that the user (101) having the account identifier (181) is a member of the loyalty program. Thus, the user (101) may use the account identifier (181) to access privileges afforded to the members of the loyalty program, such as rights to access a member only area, facility, store, product or service, discounts extended only to members, or opportunities to participate in certain events, buy certain items, or receive certain services reserved for members.

In one embodiment, it is not necessary to make a purchase to use the privileges. The user (101) may enjoy the privileges based on the status of being a member of the loyalty program.

The user (101) may use the account identifier (181) to show the status of being a member of the loyalty program.

For example, the user (101) may provide the account identifier (181) (e.g., the account number of a credit card) to the transaction terminal (105) to initiate an authorization process for a special transaction which is designed to check the member status of the user (101), in a manner similar to using the account identifier (181) to initiate an authorization process for a payment transaction. The special transaction is designed to verify the member status of the user (101) via checking whether the account data (111) is associated with the loyalty benefit offeror (183). If the account identifier (181) is associated with the corresponding loyalty benefit offeror (183), the transaction handler (103) provides an approval indication in the authorization process to indicate that the user (101) is a member of the loyalty program. The approval indication can be used as a form of identification to allow the user (101) to access member privileges, such as access to services, products, opportunities, facilities, discounts, permissions, etc., which are reserved for members.

In one embodiment, when the account identifier (181) is used to identify the user (101) as a member to access member privileges, the transaction handler (103) stores information about the access of the corresponding member privilege in loyalty record (187). The profile generator (121) may use the information accumulated in the loyalty record (187) to enhance transaction profiles (127) and provide the user (101) with personalized/targeted advertisements, with or without further offers of benefit (e.g., discounts, incentives, rebates, cash back, rewards, etc.).

In one embodiment, the association of the account identifier (181) and the loyalty benefit offeror (183) also allows the loyalty benefit offeror (183) to access at least a portion of the account data (111) relevant to the loyalty program, such as the loyalty record (187) and certain information about the user (101), such as name, address, and other demographic data.

In one embodiment, the loyalty program allows the user (101) to accumulate benefits according to loyalty program rules (185), such as reward points, cash back, levels of discounts, etc. For example, the user (101) may accumulate reward points for transactions that satisfy the loyalty program rules (185); and the user (101) may redeem the reward points for cash, gifts, discounts, etc. In one embodiment, the loyalty record (187) stores the accumulated benefits; and the transaction handler (103) updates the loyalty record (187) associated with the loyalty benefit offeror (183) and the account identifier (181), when events that satisfy the loyalty program rules (185) occur.

In one embodiment, the accumulated benefits as indicated in the loyalty record (187) can be redeemed when the account identifier (181) is used to perform a payment transaction, when the payment transaction satisfies the loyalty program rules (185). For example, the user (101) may redeem a number of points to offset or reduce an amount of the purchase price.

In one embodiment, when the user (101) uses the account identifier (181) to make purchases as a member, the merchant may further provide information about the purchases; and the transaction handler (103) can store the information about the purchases as part of the loyalty record (187). The information about the purchases may identify specific items or services purchased by the member. For example, the merchant may provide the transaction handler (103) with purchase details at stock-keeping unit (SKU) level, which are then stored as part of the loyalty record (187). The loyalty benefit offeror (183) may use the purchase details to study the purchase behavior of the user (101); and the profile generator (121) may use the SKU level purchase details to enhance the transaction profiles (127).

In one embodiment, the SKU level purchase details are requested from the merchants or retailers via authorization responses, when the account (146) of the user (101) is enrolled in a loyalty program that allows the transaction handler (103) (and/or the issuer processor (145)) to collect the purchase details.

In one embodiment, the profile generator (121) may generate transaction profiles (127) based on the loyalty record (187) and provide the transaction profiles (127) to the loyalty benefit offeror (183) (or other entities when permitted).

In one embodiment, the loyalty benefit offeror (183) may use the transaction profiles (e.g., 127 or 131) to select candidates for membership offering. For example, the loyalty program rules (185) may include one or more criteria that can be used to identify which customers are eligible for the loyalty program. The transaction handler (103) may be configured to automatically provide the qualified customers with an offer of membership in the loyalty program when the corresponding customers are performing transactions via the transaction handler (103) and/or via points of interaction (107) accessible to the entity operating the transaction handler (103), such as ATMs, mobile phones, receipts, statements, websites, etc. The user (101) may accept the membership offer via responding to the advertisement. For example, the user (101) may load the membership into the account in the same way as loading a coupon into the account of the user (101).

In one embodiment, the membership offer is provided as a coupon or is associated with another offer of benefits, such as a discount, reward, etc. When the coupon or benefit is redeemed via the transaction handler (103), the account data (111) is updated to enroll the user (101) into the corresponding loyalty program.

In one embodiment, a merchant may enroll a user (101) into a loyalty program when the user (101) is making a purchase at the transaction terminal (105) of the merchant.

For example, when the user (101) is making a transaction at an ATM, performing a self-assisted check out on a POS terminal, or making a purchase transaction on a mobile phone or a computer, the user (101) may be prompted to join a loyalty program, while the transaction is being authorized by the transaction handler (103). If the user (101) accepts the membership offer, the account data (111) is updated to have the account identifier (181) associated with the loyalty benefit offeror (183).

In one embodiment, the user (101) may be automatically enrolled in the loyalty program, when the profile of the user (101) satisfies a set of conditions specified in the loyalty program rules (185). The user (101) may opt out of the loyalty program.

In one embodiment, the loyalty benefit offeror (183) may personalize and/or target loyalty benefits based on the transaction profile (131) specific to or linked to the user (101). For example, the loyalty program rules (185) may use the user specific profile (131) to select gifts, rewards, or incentives for the user (101) (e.g., to redeem benefits, such as reward points, accumulated in the loyalty record (187)). The user specific profile (131) may be enhanced using the loyalty record (187), or generated based on the loyalty record (187). For example, the profile generator (121) may use a subset of transaction data (109) associated with the loyalty record (187) to generate the user specific profile (131), or provide more weight to the subset of the transaction data (109) associated with the loyalty record (187) while also using other portions of the transaction data (109) in deriving the user specific profile (131).

In one embodiment, the loyalty program may involve different entities. For example, a first merchant may offer rewards as discounts, or gifts from a second merchant that has a business relationship with the first merchant. For example, an entity may allow a user (101) to accumulate loyalty benefits (e.g., reward points) via purchase transactions at a group of different merchants. For example, a group of merchants may jointly offer a loyalty program, in which loyalty benefits (e.g., reward points) can be accumulated from purchases at any of the merchants in the group and redeemable in purchases at any of the merchants.

In one embodiment, the information identifying the user (101) as a member of a loyalty program is stored on a server connected to the transaction handler (103). Alternatively or in combination, the information identifying the user (101) as a member of a loyalty program can also be stored in a financial transaction card (e.g., in the chip, or in the magnetic strip).

In one embodiment, loyalty program offerors (e.g., merchants, manufactures, issuers, retailers, clubs, organizations, etc.) can compete with each other in making loyalty program related offers. For example, loyalty program offerors may place bids on loyalty program related offers; and the advertisement selector (133) (e.g., under the control of the entity operating the transaction handler (103), or a different entity) may prioritize the offers based on the bids. When the offers are accepted or redeemed by the user (101), the loyalty program offerors pay fees according to the corresponding bids. In one embodiment, the loyalty program offerors may place an auto bid or maximum bid, which specifies the upper limit of a bid; and the actual bid is determined to be the lowest possible bid that is larger than the bids of the competitors, without exceeding the upper limit.

In one embodiment, the offers are provided to the user (101) in response to the user (101) being identified by the user data (125). If the user specific profile (131) satisfies the conditions specified in the loyalty program rules (185), the offer from the loyalty benefit offeror (183) can be presented to the user (101). When there are multiple offers from different offerors, the offers can be prioritized according to the bids.

In one embodiment, the offerors can place bids based on the characteristics that can be used as the user data (125) to select the user specific profile (131). In another embodiment, the bids can be placed on a set of transaction profiles (127).

In one embodiment, the loyalty program based offers are provided to the user (101) just in time when the user (101) can accept and redeem the offers. For example, when the user (101) is making a payment for a purchase from a merchant, an offer to enroll in a loyalty program offered by the merchant or related offerors can be presented to the user (101). If the user (101) accepts the offer, the user (101) is entitled to receive member discounts for the purchase.

For example, when the user (101) is making a payment for a purchase from a merchant, a reward offer can be provided to the user (101) based on loyalty program rules (185) and the loyalty record (187) associated with the account identifier (181) of the user (101) (e.g., the reward points accumulated in a loyalty program). Thus, the user effort for redeeming the reward points can be reduced; and the user experience can be improved.

In one embodiment, a method to provide loyalty programs includes the use of a computing apparatus of a transaction handler (103). The computing apparatus processes a plurality of payment card transactions. After the computing apparatus receives a request to track transactions for a loyalty program, such as the loyalty program rules (185), the computing apparatus stores and updates loyalty program information in response to transactions occurring in the loyalty program.

The computing apparatus provides to a customer (e.g., 101) an offer of a benefit when the customer satisfies a condition defined in the loyalty program, such as the loyalty program rules (185).

Examples of loyalty programs offered through collaboration between collaborative constituents in a payment processing system, including the transaction handler (103) in one embodiment are provided in U.S. patent application Ser. No. 11/767,202, filed Jun. 22, 2007, assigned Pub. No. 2008/0059302, and entitled "Loyalty Program Service," U.S. patent application Ser. No. 11/848,112, filed Aug. 30, 2007, assigned Pub. No. 2008/0059306, and entitled "Loyalty Program Incentive Determination," and U.S. patent application Ser. No. 11/848,179, filed Aug. 30, 2007, assigned Pub. No. 2008/0059307, and entitled "Loyalty Program Parameter Collaboration," the disclosures of which applications are hereby incorporated herein by reference.

Examples of processing the redemption of accumulated loyalty benefits via the transaction handler (103) in one embodiment are provided in U.S. patent application Ser. No. 11/835,100, filed Aug. 7, 2007, assigned Pub. No. 2008/0059303, and entitled "Transaction Evaluation for Providing Rewards," the disclosure of which is hereby incorporated herein by reference.

In one embodiment, the incentive, reward, or benefit provided in the loyalty program is based on the presence of correlated related transactions. For example, in one embodiment, an incentive is provided if a financial payment card is used in a reservation system to make a reservation and the financial payment card is subsequently used to pay for the reserved good or service. Further details and examples of one embodiment are provided in U.S. patent application Ser. No. 11/945,907, filed Nov. 27, 2007, assigned Pub. No. 2008/0071587, and entitled "Incentive Wireless Communication Reservation," the disclosure of which is hereby incorporated herein by reference.

In one embodiment, the transaction handler (103) provides centralized loyalty program management, reporting and membership services. In one embodiment, membership data is downloaded from the transaction handler (103) to acceptance point devices, such as the transaction terminal (105). In one embodiment, loyalty transactions are reported from the acceptance point devices to the transaction handler (103); and the data indicating the loyalty points, rewards, benefits, etc. are stored on the account identification device (141). Further details and examples of one embodiment are provided in U.S. patent application Ser. No. 10/401,504, filed Mar. 27, 2003, assigned Pub. No. 2004/0054581, and entitled "Network Centric Loyalty System," the disclosure of which is hereby incorporated herein by reference.

In one embodiment, the portal (143) of the transaction handler (103) is used to manage reward or loyalty programs for entities such as issuers, merchants, etc. The cardholders, such as the user (101), are rewarded with offers/benefits from merchants. The portal (143) and/or the transaction handler (103) track the transaction records for the merchants for the reward or loyalty programs. Further details and examples of one embodiment are provided in U.S. patent application Ser. No. 11/688,423, filed Mar. 20, 2007, assigned Pub. No. 2008/0195473, and entitled "Reward Program Manager," the disclosure of which is hereby incorporated herein by reference.

In one embodiment, a loyalty program includes multiple entities providing access to detailed transaction data, which allows the flexibility for the customization of the loyalty program. For example, issuers or merchants may sponsor the loyalty program to provide rewards; and the portal (143) and/or the transaction handler (103) stores the loyalty currency in the data warehouse (149). Further details and examples of one embodiment are provided in U.S. patent application Ser. No. 12/177,530, filed Jul. 22, 2008, assigned Pub. No. 2009/0030793, and entitled "Multi-Vender Multi-Loyalty Currency Program," the disclosure of which is hereby incorporated herein by reference.

In one embodiment, an incentive program is created on the portal (143) of the transaction handler (103). The portal (143) collects offers from a plurality of merchants and stores the offers in the data warehouse (149). The offers may have associated criteria for their distributions. The portal (143) and/or the transaction handler (103) may recommend offers based on the transaction data (109). In one embodiment, the transaction handler (103) automatically applies the benefits of the offers during the processing of the transactions when the transactions satisfy the conditions associated with the offers. In one embodiment, the transaction handler (103) communicates with transaction terminals (e.g., 105) to set up, customize, and/or update offers based on market focus, product categories, service categories, targeted consumer demographics, etc. Further details and examples of one embodiment are provided in U.S. patent application Ser. No. 12/413,097, filed Mar. 27, 2009, assigned Pub. No. 2010-0049620, and entitled "Merchant Device Support of an Integrated Offer Network," the disclosure of which is hereby incorporated herein by reference.

In one embodiment, the transaction handler (103) is configured to provide offers from merchants to the user (101) via the payment system, making accessing and redeeming the offers convenient for the user (101). The offers may be triggered by and/or tailored to a previous transaction, and may be valid only for a limited period of time starting from the date of the previous transaction. If the transaction handler (103) determines that a subsequent transaction processed by the transaction handler (103) meets the conditions for the redemption of an offer, the transaction handler (103) may credit the consumer account (146) for the redemption of the offer and/or provide a notification message to the user (101). Further details and examples of one embodiment are provided in U.S. patent application Ser. No. 12/566,350, filed Sep. 24, 2009, assigned Pub. No. 2010/0114686, and entitled "Real-Time Statement Credits and Notifications," the disclosure of which is hereby incorporated herein by reference.

Details on loyalty programs in one embodiment are provided in U.S. patent application Ser. No. 12/896,632, filed Oct. 1, 2010, assigned Pub. No. 2011/0087530, and entitled "Systems and Methods to Provide Loyalty Programs," the disclosure of which is hereby incorporated herein by reference.

SKU

In one embodiment, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

When a user (101) shops at a traditional retail store or browses a website of an online merchant, an SKU-level profile associated specifically with the user (101) may be provided to select an advertisement appropriately targeted to the user (101) (e.g., via mobile phones, POS terminals, web browsers, etc.). The SKU-level profile for the user (101) may include an identification of the goods and services historically purchased by the user (101). In addition, the SKU-level profile for the user (101) may identify goods and services that the user (101) may purchase in the future. The identification may be based on historical purchases reflected in SKU-level profiles of other individuals or groups that are determined to be similar to the user (101). Accordingly, the return on investment for advertisers and merchants can be greatly improved.

In one embodiment, the user specific profile (131) is an aggregated spending profile (341) that is generated using the SKU-level information. For example, in one embodiment, the factor values (344) correspond to factor definitions (331) that are generated based on aggregating spending in different categories of products and/or services. A typical merchant offers products and/or services in many different categories.

In one embodiment, the user (101) may enter into transactions with various online and "brick and mortar" merchants. The transactions may involve the purchase of various goods and services. The goods and services may be identified by SKU numbers or other information that specifically identifies the goods and services purchased by the user (101).

In one embodiment, the merchant may provide the SKU information regarding the goods and services purchased by the user (101) (e.g., purchase details at SKU level) to the operator of the transaction handler (103). In one embodiment, the SKU information may be provided to the operator of the transaction handler (103) in connection with a loyalty program, as described in more detail below. The SKU information may be stored as part of the transaction data (109) and associated with the user (101). In one embodiment, the SKU information for items purchased in transactions facilitated by the operator of the transaction handler (103) may be stored as transaction data (109) and associated with its associated purchaser. In one embodiment, the SKU level purchase details are requested from the merchants or retailers via authorization responses, when the account (146) of the user (101) is enrolled in a program that allows the transaction handler (103) (and/or the issuer processor (145)) to collect the purchase details.

In one embodiment, based on the SKU information and perhaps other transaction data, the profile generator (121) may create an SKU-level transaction profile for the user (101). In one embodiment, based on the SKU information associated with the transactions for each person entering into transactions with the operator of the transaction handler (103), the profile generator (121) may create an SKU-level transaction profile for each person.

In one embodiment, the SKU information associated with a group of purchasers may be aggregated to create an SKU-level transaction profile that is descriptive of the group. The group may be defined based on one or a variety of considerations. For example, the group may be defined by common demographic features of its members. As another example, the group may be defined by common purchasing patterns of its members.

In one embodiment, the user (101) may later consider the purchase of additional goods and services. The user (101) may shop at a traditional retailer or an online retailer. With respect to an online retailer, for example, the user (101) may browse the website of an online retailer, publisher, or merchant. The user (101) may be associated with a browser cookie to, for example, identify the user (101) and track the browsing behavior of the user (101).

In one embodiment, the retailer may provide the browser cookie associated with the user (101) to the operator of the transaction handler (103). Based on the browser cookie, the operator of the transaction handler (103) may associate the browser cookie with a personal account number of the user (101). The association may be performed by the operator of the transaction handler (103) or another entity in a variety of manners such as, for example, using a look up table.

Based on the personal account number, the profile selector (129) may select a user specific profile (131) that constitutes the SKU-level profile associated specifically with the user (101). The SKU-level profile may reflect the individual, prior purchases of the user (101) specifically, and/or the types of goods and services that the user (101) has purchased.

The SKU-level profile for the user (101) may also include identifications of goods and services the user (101) may purchase in the future. In one embodiment, the identifications may be used for the selection of advertisements for goods and services that may be of interest to the user (101). In one embodiment, the identifications for the user (101) may be based on the SKU-level information associated with historical purchases of the user (101). In one embodiment, the identifications for the user (101) may be additionally or alternatively based on transaction profiles associated with others. The recommendations may be determined by predictive association and other analytical techniques.

For example, the identifications for the user (101) may be based on the transaction profile of another person. The profile selector (129) may apply predetermined criteria to identify another person who, to a predetermined degree, is deemed sufficiently similar to the user (101). The identification of the other person may be based on a variety of factors including, for example, demographic similarity and/or purchasing pattern similarity between the user (101) and the other person. As one example, the common purchase of identical items or related items by the user (101) and the other person may result in an association between the user (101) and the other person, and a resulting determination that the user (101) and the other person are similar. Once the other person is identified, the transaction profile constituting the SKU-level profile for the other person may be analyzed. Through predictive association and other modeling and analytical techniques, the historical purchases reflected in the SKU-level profile for the other person may be employed to predict the future purchases of the user (101).

As another example, the identifications of the user (101) may be based on the transaction profiles of a group of persons. The profile selector (129) may apply predetermined criteria to identify a multitude of persons who, to a predetermined degree, are deemed sufficiently similar to the user (101). The identification of the other persons may be based on a variety of factors including, for example, demographic similarity and/or purchasing pattern similarity between the user (101) and the other persons. Once the group constituting the other persons is identified, the transaction profile constituting the SKU-level profile for the group may be analyzed. Through predictive association and other modeling and analytical techniques, the historical purchases reflected in the SKU-level profile for the group may be employed to predict the future purchases of the user (101).

The SKU-level profile of the user (101) may be provided to select an advertisement that is appropriately targeted. Because the SKU-level profile of the user (101) may include identifications of the goods and services that the user (101) may be likely to buy, advertisements corresponding to the identified goods and services may be presented to the user (101). In this way, targeted advertising for the user (101) may be optimized. Further, advertisers and publishers of advertisements may improve their return on investment, and may improve their ability to cross-sell goods and services.

In one embodiment, SKU-level profiles of others who are identified to be similar to the user (101) may be used to identify a user (101) who may exhibit a high propensity to purchase goods and services. For example, if the SKU-level profiles of others reflect a quantity or frequency of purchase that is determined to satisfy a threshold, then the user (101) may also be classified or predicted to exhibit a high propensity to purchase. Accordingly, the type and frequency of advertisements that account for such propensity may be appropriately tailored for the user (101).

In one embodiment, the SKU-level profile of the user (101) may reflect transactions with a particular merchant or merchants. The SKU-level profile of the user (101) may be provided to a business that is considered a peer with or similar to the particular merchant or merchants. For example, a merchant may be considered a peer of the business because the merchant offers goods and services that are similar to or related to those of the business. The SKU-level profile reflecting transactions with peer merchants may be used by the business to better predict the purchasing behavior of the user (101) and to optimize the presentation of targeted advertisements to the user (101).

Details on SKU-level profile in one embodiment are provided in U.S. patent application Ser. No. 12/899,144, filed Oct. 6, 2010, published as U.S. Pat. App. Pub. No. 2011/0093335 and entitled "Systems and Methods for Advertising Services Based on an SKU-Level Profile," the disclosure of which is hereby incorporated herein by reference.

Real-Time Messages

In one embodiment, the transaction handler (103) is configured to cooperate with the media controller (115) to facilitate real-time interaction with the user (101) when the payment of the user (101) is being processed by the transaction handler (103). The real-time interaction provides the opportunity to impact the user experience during the purchase (e.g., at the time of card swipe), through delivering messages in real-time to a point of interaction (107), such as a mobile phone, a personal digital assistant, a portable computer, etc. The real-time message can be delivered via short message service (SMS), email, instant messaging, or other communications protocols.

In one embodiment, the real-time message is provided without requiring modifications to existing systems used by the merchants and/or issuers.

Figure 9:
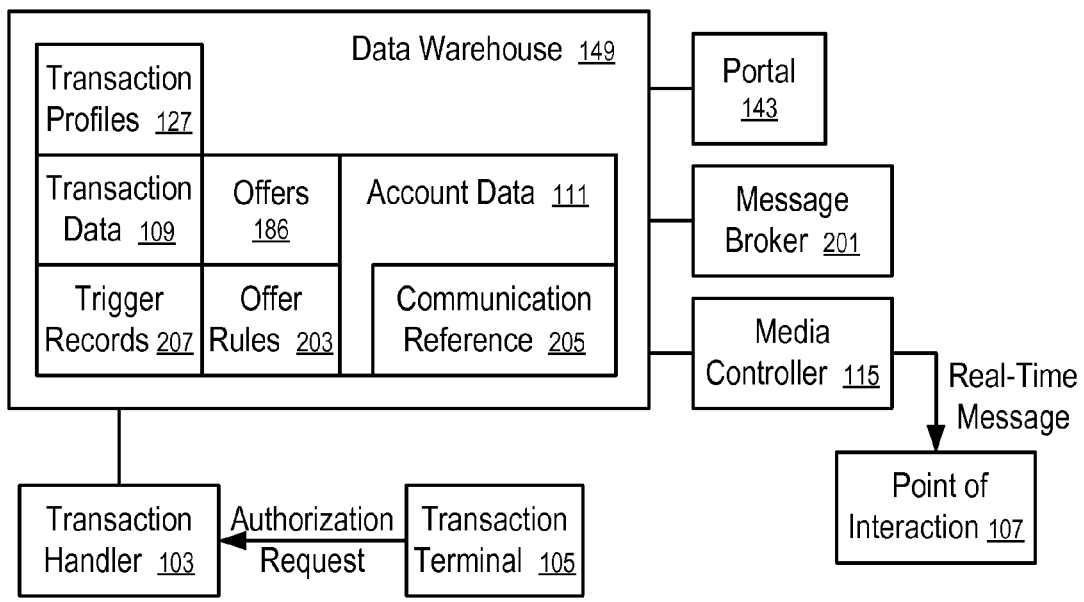
FIG. 9 shows a system to provide real-time messages according to one embodiment.

FIG. 9 shows a system to provide real-time messages according to one embodiment. In FIG. 9, the transaction handler (103) (or a separate computing system coupled with the transaction handler (103)) is to detect the occurrence of certain transactions of interest during the processing of the authorization requests received from the transaction terminal (105); a message broker (201) is to identify a relevant message for the user (101) associated with the corresponding authorization request; and the media controller (115) is to provide the message to the user (101) at the point of interaction (107) via a communication channel separate from the channel used by the transaction handler (103) to respond to the corresponding authorization request submitted from the transaction terminal (105).

In one embodiment, the media controller (115) is to provide the message to the point of interaction (107) in parallel with the transaction handler (103) providing the response to the authorization request.

In one embodiment, the point of interaction (107) receives the message from the media controller (115) in real-time with the transaction handler (103) processing the authorization request. In one embodiment, the message is to arrive at the point of interaction (107) in the context of the response provided from the transaction handler (103) to the transaction terminal (105). For example, the message is to arrive at the point of interaction (107) substantially at the same time as the response to the authorization request arrives at the transaction terminal (105), or with a delay not long enough to cause the user (101) to have the impression that the message is in response to an action other than the payment transaction. For example, the message is to arrive at the point of interaction (107) prior to the user (101) completing the transaction and leaving the transaction terminal (105), or prior to the user (101) leaving the retail location of the merchant operating the transaction terminal (105).

In FIG. 9, the system includes a portal (143) to provide services to merchants and/or the user (101).

For example, in one embodiment, the portal (143) allows the user (101) to register the communication reference (205) in association with the account data (111), such as the account information (142) of the consumer account (146); and the media controller (115) is to use the communication reference (205) to deliver the message to the point of interaction (107). Examples of the communication reference (205) include a mobile phone number, an email address, a user identifier of an instant messaging system, an IP address, etc.

In one embodiment, the portal (143) allows merchants and/or other parties to define rules (203) to provide offers (186) as real-time responses to authorization requests; and based on the offer rules (203), the message broker (201) is to generate, or instruct the media controller (115) to generate, the real-time message to provide the offers (186) to the user (101). For example, the offer (186) may include a discount, incentive, reward, rebate, gift, or other benefit, which can be redeemed upon the satisfaction of certain conditions required by the offer rules (203). In one embodiment, based on the offer rules (203) the message broker (201) configures a message by selecting the appropriate message template from (an) existing message(s) template(s), and inserts any relevant data (e.g., the communication reference (205)) into the selected template, then passes the configured message to the media controller (115), which delivers the message to the point of interaction (107). In one embodiment, the message broker (201) (or a subsystem) is used to manage message templates along with the rules for selecting the appropriate message template from among several potential choices.

In one embodiment, the offer rules (203) include offer details, targeting rules, advertisement campaign details, profile mapping, creative mapping, qualification rules, award/notify/fulfillment rules, approvals, etc. Creative elements for offers include text, images, channels, approvals, etc.

In one embodiment, when the offer rules (203) are activated by the merchant or advertiser via the portal (143), the message broker (201) is to generate trigger records (207) for the transaction handler (103). The transaction handler (103) is to monitor the incoming authorization requests to identify requests that satisfy the conditions specified in the trigger records (207) during the process of the authorization requests, and to provide the information about the identified requests to the message broker (201) for the transmission of an appropriate real-time message in accordance with the offer rules (203).

In one embodiment, the generation of the trigger records (207) for the transaction handler (103) is in real-time with the merchant or advertiser activating the offer rules (203). Thus, the offer rules (203) can be activated and used for the detection of the new authorization requests in real-time, while the transaction handler (103) continues to process the incoming authorization requests.

In one embodiment, the portal (143) provides information about the spending behaviors reflected in the transaction data (109) to assist the merchants or advertisers to target offers or advertisements. For example, in one embodiment, the portal (143) allows merchants to target the offers (186) based on transaction profiles (127). For example, the offer rules (203) are partially based on the values in a transaction profile (127), such as an aggregated spending profile (341). In one embodiment, the offer rules (203) are partially based on the information about the last purchase of the user (101) from the merchant operating the transaction terminal (105) (or another merchant), and/or the information about the location of the user (101), such as the location determined based on the location of the transaction terminal (105) and/or the location of the merchant operating the transaction terminal (105).

In one embodiment, the portal (143) provides transaction based statistics, such as merchant benchmarking statistics, industry/market segmentation, etc., to assist merchants and advertisers to identify customers.

Thus, the real-time messages can be used to influence customer behaviors while the customers are in the purchase mode.

In one embodiment, the benefit of the offers (186) can be redeemed via the transaction handler (103). The redemption of the offer (186) may or may not require the purchase details (e.g., SKU level purchase details). Details in one embodiment about redeeming offers (186) via the transaction handler (103) are provided in U.S. patent application Ser. No. 13/113,710, filed May 23, 2011 and entitled "Systems and Methods for Redemption of Offers," the disclosure of which is hereby incorporated herein by reference.

In one embodiment, when the authorization request for a purchase indicates that the purchase qualifies the offer (186) for redemption if the purchase corresponding to the authorization request is completed, the message broker (201) is to construct a message and use the media controller (115) to deliver the message in real-time with the processing of the authorization request to the point of interaction (107). The message informs the user (101) that when the purchase is completed, the transaction handler (103) and/or the issuer processor (145) is to provide the benefit of the offer (186) to the user (101) via statement credit or some other settlement value, for example points in a registered loyalty program, or credit at the point of sale using a digital coupon delivered to the purchaser via mobile phone.

In one embodiment, the settlement of the payment transaction corresponding to the authorization request does not occur in real-time with the processing of the authorization request. For example, the merchant may submit the complete purchases for settlement at the end of the day, or in accordance with a predetermined schedule. The settlement may occur one or more days after the processing of the authorization request.

In one embodiment, when transactions are settled, the settled transactions are matched to the authorization requests to identify offers (186) that are redeemable in view of the settlement. When the offer (186) is confirmed to be redeemable based on a record of successful settlement, the message broker (201) is to use the media controller (115) to provide a message to the point of interaction (107) of the user (101), such as the mobile phone of the user (101). In one embodiment, the message is to inform the user (101) of the benefit to be provided as statement credits and/or to provide additional offers. In one embodiment, the message to confirm the statement credits is transmitted in real-time with the completion of the transaction settlement.

In one embodiment, the message broker (201) is to determine the identity of the merchant based on the information included in the authorization request transmitted from the transaction terminal (105) to the transaction handler (103). In one embodiment, the identity of the merchant is normalized to allow the application of the offer rules (203) that are merchant specific.

In one embodiment, the portal (143) is to provide data insight to merchants and/or advertisers. For example, the portal (143) can provide the transaction profile (127) of the user (101), audience segmentation information, etc.

In one embodiment, the portal (143) is to allow the merchants and/or advertisers to define and manage offers (186) for their creation, fulfillment and/or delivery in messages.

In one embodiment, the portal (143) allows the merchants and/or advertisers to test, run and/or monitor the offers (186) for their creation, fulfillment and/or delivery in messages.

In one embodiment, the portal (143) is to provide reports and analytics regarding the offers (186).

In one embodiment, the portal (143) provides operation facilities, such as onboarding, contact management, certification, file management, workflow assistance, etc. to assist the merchants and/or advertisers to complete the tasks related to the offers (186).

In one embodiment, the portal (143) allows the user (101) to opt in or opt out of the real-time message delivery service.

In one embodiment, an advertiser or merchant can select an offer fulfillment method from a list of options, such as statement credits, points, gift cards, e-certificates, third party fulfillment, etc.

In one embodiment, the merchant or advertiser is to use the "off the rack" transaction profiles (127) available in the data warehouse (149). In one embodiment, the merchant or advertiser can further edit parameters to customize the generation of the transaction profiles (127) and/or develop custom transaction profiles from scratch using the portal (143).

In one embodiment, the portal (143) provides a visualization tool to allow the user to see clusters of data based on GeoCodes, proximity, transaction volumes, spending patterns, zip codes, customers, stores, etc.

In one embodiment, the portal (143) allows the merchant or advertiser to define cells for targeting the customers in the cells based on date/time, profile attributes, map to offer/channel/creative, condition testing, etc.

In one embodiment, the portal (143) allows the merchant or advertiser to monitor the system health, such as the condition of servers, files received or sent, errors, status, etc., the throughput by date or range, by program, by campaign, or by global view, and aspects of current programs/offers/campaigns, such as offer details, package audit reports, etc. In one embodiment, reporting includes analytics and metrics, such as lift, conversion, category differentials (e.g., spending patterns, transaction volumes, peer groups), and reporting by program, campaign, cell, GeoCode, proximity, ad-hoc, auditing, etc.

Figure 10:
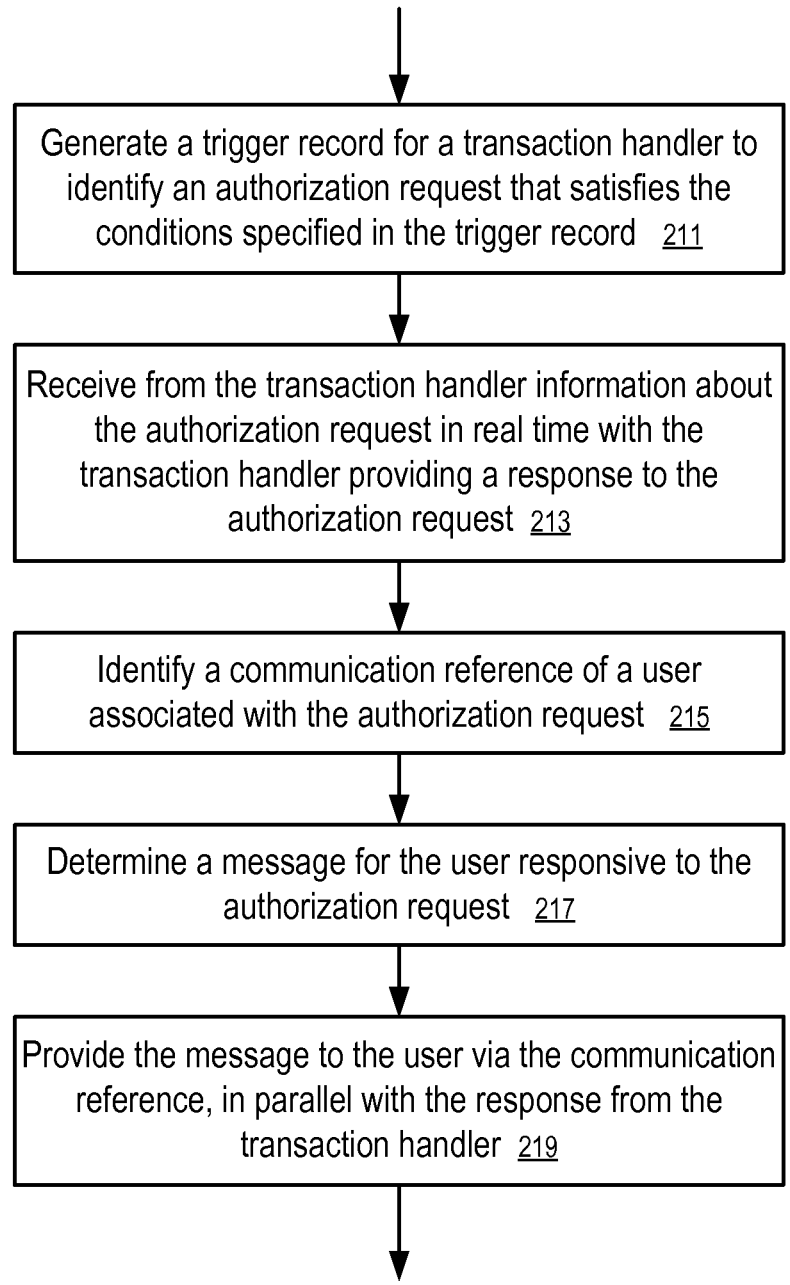
FIG. 10 shows a method to provide real-time messages according to one embodiment.

FIG. 10 shows a method to provide real-time messages according to one embodiment. In FIG. 10, a computing apparatus is to generate (211) a trigger record (207) for a transaction handler (103) to identify an authorization request that satisfies the conditions specified in the trigger record (207), receive (213) from the transaction handler (103) information about the authorization request in real-time with the transaction handler (103) providing a response to the authorization request to a transaction terminal (105), identify (215) a communication reference (205) of a user (101) associated with the authorization request, determine (217) a message for the user (101) responsive to the authorization request, and provide (219) the message to the user (101) at a point of interaction (107) via the communication reference (205), in parallel with the response from the transaction handler (103) to the transaction terminal (105).

In one embodiment, the computing apparatus includes at least one of: a transaction handler (103), a message broker (201), a media controller (115), a portal (143) and a data warehouse (149).

Merchant Aggregator

In one embodiment, real-time information about transactions is communicated to a remote computing device, such as a merchant aggregator, which has a plurality of merchants as clients. The computing device is connected to the portal (143) of the transaction handler (103) a communication network (e.g., Internet, a wide area network, or a dedicate network) to receive the real-time information and provide services to the merchants and their customers.

In one embodiment, the remote computing device, such as the merchant aggregator, is configured to provide offers (186) to customers (e.g., user (101)) on behalf of the merchants, service loyalty programs on behalf of the merchants, and/or provide rewards to customers (e.g., user (101)) for their interaction with the merchants, etc. The real-time information about the transactions between the merchants and the customers allows the remote computing device to provide new services and improve existing services.

In one embodiment, the computing device remotely connected to the portal (143), such as a merchant aggregator, is configured to enroll merchants and/or customers (e.g., user (101)) to provide services based on the real-time information about transactions between the merchants and the customers (e.g., user (101)). However, the identifiers used by the portal (143) to identify the enrolled merchants are generally different from merchant identifies used by the transaction handler (103) in processing transactions initiated using the transaction terminals (e.g., 105) of the merchants. Thus, the identifiers used by the portal (143) to identify the enrolled merchants may not be sufficient to identify the transactions between the enrolled merchants and the enrolled customers.

In one embodiment, the portal (143) of the transaction handler (103) is configured to match the identities of the merchants as known to the remote computing device, such as the merchant aggregator, with the identities of the merchants as known to the transaction handler (103), to facilitate the monitoring of transactions of the merchants and to generate the real-time information about the transactions between the respective merchants and enrolled customers (e.g., user (101)).

In one embodiment, the portal (143) is configured to link a merchant identifier of a merchant as known to the remote computing device to a merchant identifier of the merchant as known to the transaction handler (103) via a transaction made using a transaction terminal (105) of the merchant. Information about the transaction is communicated between the portal (143) and the remote computing device, in association with the merchant identifier of the merchant as known to the remote computing device, to identify the transaction from the transactions processed the transaction handler (103) and thus link the merchant identifier of the merchant as known to the remote computing device, to the merchant identifier used in the identified transaction.

Alternatively or in combination, the portal (143) is configured to link the merchant identifier of the merchant as known to the remote computing device to the merchant identifier of the merchant as known to the transaction handler (103) based at least in part on marching attributes of the merchant, such as name, address, business category, etc.

For example, when a merchant enrolls or registers with the remote computing device to receive the services of the remote computing device, the remote computing device is configured to collect information about the merchant, such as the business name of the merchant, the street address of the merchant, the business category of the merchant, etc. Such information about the merchant can be matched with the respective merchant information in the data warehouse stored for the merchants as known to the transaction handler (103). Different data fields, such as name, address, business field, may provide partial match for a given merchant identifier of the merchant as known to the remote computing device; and a rule engine is configured in one embodiment to rank the degree of match and select one or more top ranked candidate merchant identifiers, as used in transactions processed by the transaction handler (103).

In one embodiment, a transaction is initiated on a transaction terminal (105) of a merchant as part of the process to register or enroll the merchant for the services of the remote computing device. The transaction is identified as part of information about the merchant, in association with the merchant identifier of the merchant as known to the remote computing device. The merchant identifier used in the transaction is thus linked to the merchant identifier of the merchant as known to the remote computing device. Thus, transactions of the merchant can be monitored using the merchant identifier used in the transaction formed as part of the process to register or enroll the merchant.

In one embodiment, the transaction formed as part of the process to register or enroll the merchant is performed in a predetermined account. The information about the transaction is provided to the portal (143) to allow the portal (143) to identify a transaction record for the transaction, based on attributes such as the date and/or time of the transaction, the transaction amount, an authorization code for the transaction, and a message (e.g., a pseudo-promotional code) transmitted to the transaction handler (103) in an authorization request for the transaction, etc. The portal (143) is configured to identify the transaction record (e.g., 301) of the transaction based on matching the attributes as identified in the information transmitted from the remote computing device to the portal (143).

In one embodiment, the portal (143) is configured to communicate with the remote computing device to determine one or more parameters of the transaction performed on the transaction terminal (105) of a merchant to enroll or register the merchant. Examples of the parameters that can be configured to uniquely identify merchants to be enrolled include transaction amounts, pseudo-promotional code, etc. After one or more parameters are determined to uniquely identify the merchant among a set of merchants currently in the process of being enrolled or registered, the transaction terminal (105) is used to initiate the transaction according to the one or more parameters; and the transaction handler (103) is configured to monitor transactions being processed to detect the transaction initiate the transaction according to the one or more parameters. In response to the detection of authorization request initiated on the transaction terminal (105) of the merchant for the transaction made according to the one or more parameters, the merchant identifier used in the authorization request is extracted and linked to the merchant as registered and/or enrolled.

In one embodiment, enrollment communication between the portal (143) and the remote computing device includes not only the identification information about the merchant, but also the identification information of the transaction terminal (105) used to initiate the transaction designed to register the merchant and/or the transaction terminal (105). In one embodiment, information about the transaction terminal (105) includes an identifier of the transaction terminal (105) (e.g., a serial number), a location of the transaction terminal (105) (e.g., a street address of a retail store in which the transaction terminal (105) is deployed, a GPS position of the transaction terminal (105), a description of the location of the transaction terminal (105) within a retail store in which a plurality of transaction terminals (e.g., 105) of the merchant are located).

In one embodiment, multiple transactions are performed to individually identify the transaction terminals of the merchant. Thus, the transaction handler (103) can monitor the transactions made using specific transaction terminals of the merchant and/or provide information about the transaction terminals on which the monitored transactions are initiated.

In one embodiment, when an authorization request for a transaction made using the one or more parameters assigned to uniquely identify the merchant and/or the transaction terminal (105) of the merchant is detected, the transaction handler (103) is configured to communicate with the portal (143) to provide a response to indicate the detection of the transaction. For example, in one embodiment, the transaction handler (103) is configured to provide an indication via the authorization response to indicate the recognition of the merchant and/or the transaction terminal (105). For example, in one embodiment, the portal (143) is configured to provide a message to the remote computing device to indicate the successful detection of transaction associated with the merchant and/or the transaction terminal (105) and completion of the registration or enrollment process.

Figure 11:
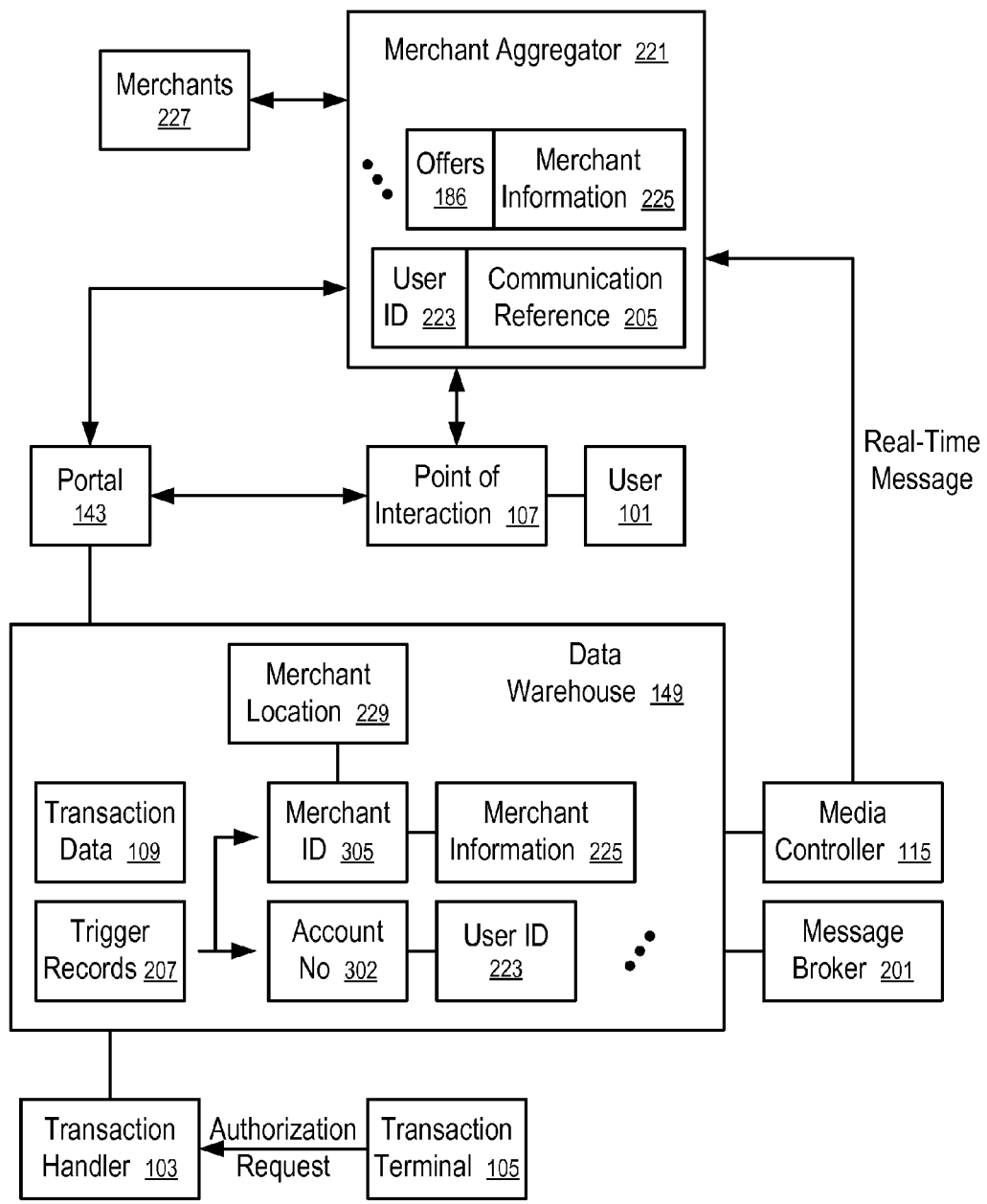
FIG. 11 shows a system configured to communicate via a merchant aggregator according to one embodiment.

FIG. 11 shows a system configured to communicate via a merchant aggregator according to one embodiment. In FIG. 11, the merchant aggregator (221) is configured to communicate with merchants (227) to enroll the merchants (227) for the services of the system.

In one embodiment, when the merchant aggregator (221) enrolls a new merchant, the merchant aggregator provides merchant information (225) to the portal (143) of the transaction handler (103) to request the portal (143) and/or the transaction handler (103) to monitor the transactions of the respective merchant (227).

In one embodiment, the merchant information (225) used by the merchant aggregator (221) to identify the merchant (227) may include the business data (e.g., corporation data, corporation name, consumer-facing name, "doing business as" names, names of affiliates and/or subsidiaries), addresses and store locations, etc. of the merchant (227). In one embodiment, the merchant information (225) further includes information about the acquirer representing the merchant, merchant category, and/or other relevant information that is helpful in identifying the merchant in the transaction processing network having the transaction handler (103) interconnecting acquirer processors (e.g., 147) operated by acquirers representing respective merchants and issuer processors (e.g., 145) operated by issuers representing respective users (101) of consumer accounts (146).

For example, in one embodiment, the merchant aggregator (221) provides the merchant information (225) via a spreadsheet identifying a list of merchants (227). In the spreadsheet, each merchant (227) is identified via the corporate name of the merchant (227) and the consumer-facing name of the merchant. For less well known merchants (e.g., small businesses), the spreadsheet further identifies the name of the acquiring bank that represents the merchant (227) in processing transactions to be processed via the transaction handler (103). In one embodiment, the spreadsheet further includes the desired starting date of monitoring the transactions of the merchants (227) identified in the spreadsheet and the expected ending date of monitoring the transactions of the merchant (227) for the merchant aggregator (221).

In one embodiment, the portal (143) is configured to provide a user interface that allows the merchant aggregator (221) to specify data for the creation of the trigger records (207) associated with an offer campaign. For example, the user interface in one embodiment allows the merchant aggregator (221) to create an offer campaign associated with one of the merchants (227) identified in the spreadsheet provided to identify the merchants (227). To support the offer campaign, the user interface is configured to allow the merchant aggregator (221) to specify rules to monitor the transactions of the respect merchant (227). For example, the rules may identify a date to start testing of the monitoring of the transactions of the merchant (227), a date to send the monitoring of the transactions of the merchant (227) for the purpose of the offer campaign, a request for a notification of transactions provided in real time as the processing of the authorization requests of the respective transactions of the merchant (227), and/or a request for a notification of transactions provided in real time as the processing of the settlement requests of the respective transactions of the merchant (227). In one embodiment, the user interface further allows the merchant aggregator (221) to specify other requirements to select transactions to be monitored, such as requirements based on transaction amount, transaction time, characteristics of the user (101) purchasing from the merchant (227), etc. In one embodiment, the user interface further allows the merchant aggregator (221) to specify messages to be transmitted, in a way as illustrated in FIG. 9, to the respective user (101) transacting with the merchant (227), in response to the transactions detected according to the offer rules.

In one embodiment, the portal (143) is configured to correctly identify transactions associated with the enrolled merchant (227) based on the merchant information (225), and calculate the location of the transactions to enable location based services associated with the offer (186) of the merchant (227).

In one embodiment, based on the merchant information (225), the portal (143) is configured to identify one or more merchant IDs (305) that are configured to be used in authorization requests for transactions of the merchant (227) identified by the merchant information (225). The identified merchant ID (305) is used to generate the trigger records (207) for monitoring the transactions of the merchant (227) identified by the merchant information (225) provided by the merchant aggregator (221).

In one embodiment, the account holders (e.g., user (101)) are required to enroll with the system to provide the consent for the media controller (115) to send the transaction information of the account holders (e.g., user (101)) to the merchant aggregator (221), and for the media controller (115) and/or the merchant aggregator (221) to send messages to the point of interaction (107) of the user (101) based on the transaction information.

In FIG. 11, after user enrollment, the user (101) of the consumer account (146) is identified to be associated with a user ID (223) used by the merchant aggregator (221) to identify the user (101). The user (101) may further provide the communication reference (205) to the merchant aggregator (221) to receive offers (186), rewards, notifications, alerts, etc. The transaction handler (103) is configured to use the trigger records (207) containing the account number (302) of the user (101) to detect the transactions of the user (101) (e.g., the transactions between the user (101) between one or more the enrolled merchants (e.g., 227)).

To associate the account number (302) with the user ID (223) in one embodiment, the account number (302) of the consumer account (146) of the user (101) is identified to the portal (143) during the user enrollment and stored in the data warehouse (149) in association with the user ID (223).

For example, during the user enrollment process, the point of interaction (107) (e.g., a web browser, a mobile phone) of the user (101) interacting with the merchant aggregator (221) is redirected in one embodiment from the merchant aggregator (221) to the portal (143) with a reference to the user ID (223); and in response, the portal (143) provides a user interface to the point of interaction (107) of the user (101) to specify the account number (302). After the account number (302) specified by the user (101) is validated and/or authenticated (e.g., via security code, person identification number, security questions, security devices, etc.), the account number (302) is associated with the user ID (223) in the data warehouse (149) of the transaction handler (103).

In one embodiment, more than one account number (302) of the consumer accounts (146) of the user (101) can be associated with the single user ID (223) used by the merchant aggregator (221) to represent the user (101).

In one embodiment, the user ID (223) is assigned to the user (101) by the merchant aggregator (221) during the enrollment process. Alternatively, the portal (143) may generate and assign the user ID (223) for the user during the enrollment process and provide the user ID (223) to the merchant aggregator (221) to complete the enrollment of the user (101).

In one embodiment, during the enrollment process, the user (101) provides the account number (302) to the merchant aggregator (221), which indicates the association between the account number (302) and the user ID (223) to the portal (143) of the transaction handler (103); and the user ID (223) is subsequently used to identify the user (101) is messages to the merchant aggregator (221). Alternatively, the account number (302) may be used directly to identify the user (101), when the real-time message from the media controller (115) to the merchant aggregator (221) is transmitted over a secure communication channel.

In one embodiment, the trigger record (207) is generated based at least in part on the account number (302) and the merchant ID (305) to monitor the transactions between the user (101) and the merchant (227). When the authorization request from the transaction terminal (105) of the merchant (227) identifies the account number (302) and the merchant ID (305), as required by the trigger record (207) (and satisfies other requirements of the trigger record (207), such as requirements related to the date and time of the transaction, the amount of the transaction, etc.), the transaction handler (103) causes the message broker (201) to generate a message and transmit the message to the merchant aggregator (221), in real time with the processing of the transaction, to inform the merchant aggregator (221) of the transaction.

In one embodiment, the data warehouse (149) stores the merchant location (229) for the merchant ID (305) associated with the transaction terminal (105).

In one embodiment, in response to the authorization request from the transaction terminal (105), the merchant location (229) of the transaction terminal (105) is determined and included in the real-time message generated by the message broker (201) and provided to the merchant aggregator (221) in a generic, machine-readable format (e.g., XML). Based on the information provided in the real-time message, the merchant aggregator (221) may use the communication reference (205) to communicate offers (186), rewards, messages, notifications, alerts, etc. to the point of interaction (107) of the user (101), such as via messages to a mobile phone identified by the communication reference (205) and/or a mobile application running on the mobile phone of the user (101).

In FIG. 11, the merchant aggregator (221) is configured to communicate with the point of interaction (107) of the user (101) in response to the real-time message from the media controller (115). Alternatively or in combination, the data warehouse (149) may store the communication reference (205), which is used by the media controller (115) to provide one or more separate real-time messages related to location-based offers (186) to the point of interaction (107) of the user (101) without going through the merchant aggregator (221).

In one embodiment, a merchant (227) may have a number of subsidiaries with different names and locations. In response to the merchant information (225), merchant data related to merchant accounts (148) are searched to identify a set of possible matches to the merchant information (225), which may be further communicated to the merchant aggregator (221) for confirmation. For example, in one embodiment, each matched merchant ID is augmented with the respective address of the transaction terminals operated by the respective merchant entity; and the merchant (227) may further confirm the enrollment of the respective merchant entity. In one embodiment, the names and addresses of the merchant information (225) are matched with the names and addresses of the merchant data for merchant accounts (148) to identify the merchant entity that is enrolled via the merchant information (225).

In one embodiment, a plurality of merchant IDs (305) may match the merchant information (225) specified by the merchant aggregator (221); and one or more merchant locations corresponding to the locations of the transaction terminals (105) may associate with a merchant ID (305) in the data warehouse (149). When the trigger record (207) matches a transaction, the merchant location (229) corresponding to the transaction terminal (105) from which the authorization request is received is used for the location-based service provided by the merchant aggregator (221) and/or the message broker (201).

Figure 12:
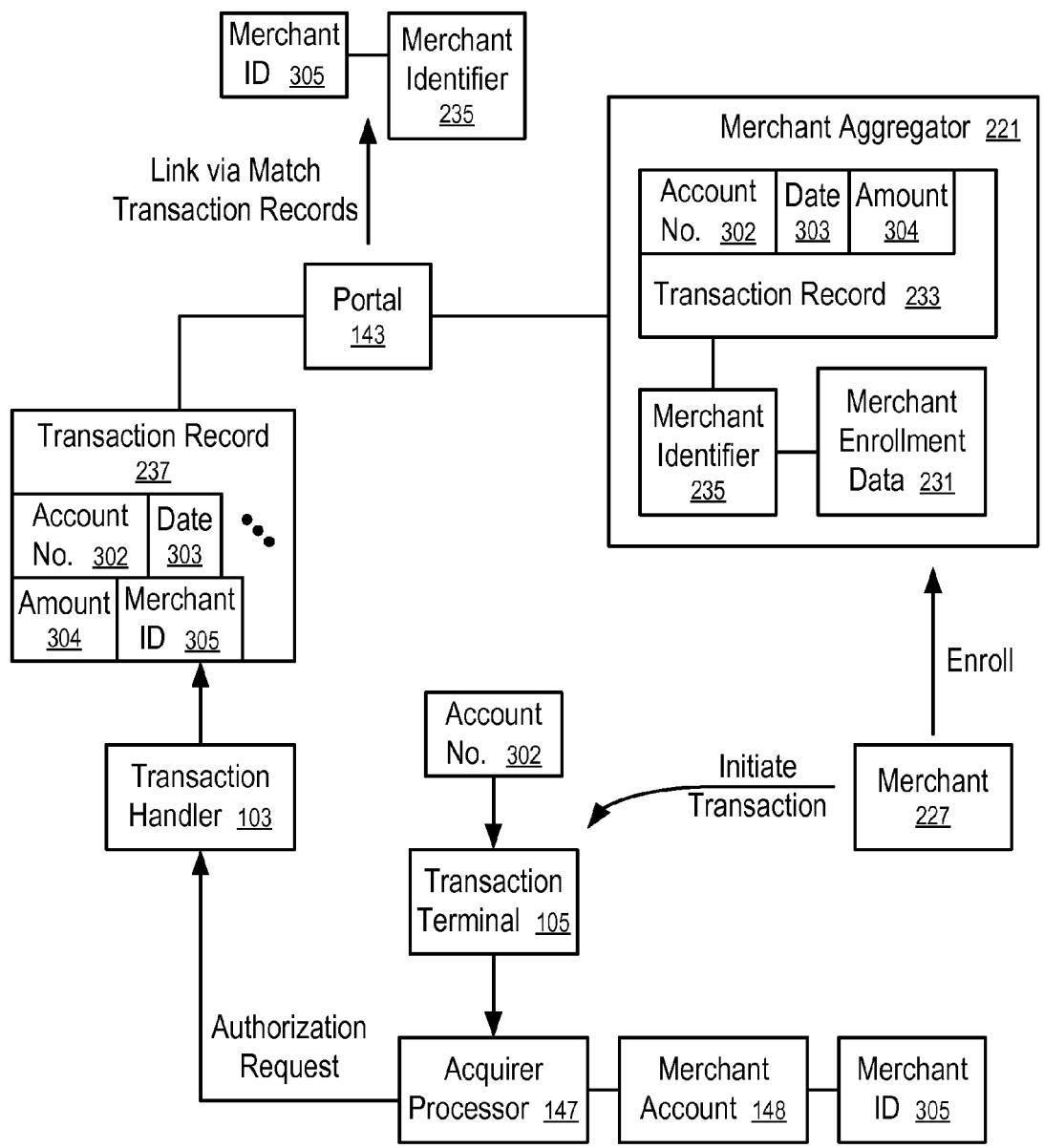
FIG. 12 shows a system to enroll a merchant according to one embodiment.

FIG. 12 shows a system to enroll a merchant according to one embodiment. In FIG. 12, a transaction made using a predetermined account number (302) is used to correlate the merchant information (225) (e.g., a merchant identifier (235) of the merchant as known to the merchant aggregator (221)) with the merchant ID (305) used in the transaction messages processed by the transaction handler (103).

In FIG. 12, when the merchant (227) enrolls with the merchant aggregator (221), the merchant enrollment data (231), including the merchant information (225), is generated to identify the names and locations of the enrolled merchant (227). The merchant aggregator (221) uses the merchant identifier (235) to represent the enrolled merchant (227).

In one embodiment, to correlate the merchant identifier (235) with a merchant ID (305) associated with the merchant account (148), the transaction terminal (105) at the enrolled location of the merchant (227) is used to initiate a transaction using a predetermined account number (302). After the transaction is initiated, the acquirer processor (147) connected to the transaction terminal (105) provides the authorization request to the transaction handler (103), which stores the transaction record (237) that includes the predetermined account number (302), the merchant ID (305), the date (303) of the transaction, the amount (304) of the transaction, the authorization code provided by the transaction handler (103), through the acquirer processor (147), to the transaction terminal (105) for the transaction, etc.

In one embodiment, the merchant aggregator (221) stores a separate transaction record (233) including certain information about the transaction as identified by the enrolling merchant (227), such as the predetermined account number (302), the date (303) (or the time period in which transaction is performed), the amount (304), and the authorization code received by the transaction terminal (105), through the acquirer processor (147) and the transaction handler (103), for the transaction, etc.

In FIG. 12, the portal (143) is configured to match the transaction records (233 and 237) to link the merchant ID (305) to the merchant identifier (235), using one or more sets of corresponding fields of the transaction records (233 and 237).

For example, during the enrollment period, the portal (143) is configured to retrieve transactions records (237) for the predetermined account number (302) from the data warehouse (149); and the merchant aggregator (221) is configured to provide its transaction record (233) with the merchant identifier (235) to the portal (143). The portal (143) is configured to match the transaction records (233 and 237) based on the account number (302), the transaction date (303), and/or the transaction amount (304). When a match is detected, the merchant ID (305) (and the identifier of the transaction terminal (105)) from the transaction record (237) generated by the transaction handler (103) is linked to the merchant identifier (235) associated with the transaction record (233) stored by the merchant aggregator (221).

Using the system of FIG. 12, the merchant (227) can selectively enroll certain transaction terminals (105) operated under certain names and/or at certain locations. Thus, the merchant (227) may enroll a portion of the transaction terminals (105) under the control of the merchant (227) but not another portion of the transaction terminals (105) under the control of the merchant (227). Different transaction terminals e.g., 105) of a merchant may have different merchant ID (305) and/or transaction terminal IDs. Through transactions initiated using the different transaction terminals of the merchant, the merchant identifier (235) representing an enrolled merchant is linked to the different merchant ID (305) and/or transaction terminal IDs as used in authorization request for the transactions made using respective transaction terminals of the corresponding enrolled merchant.

In one embodiment, the transaction record (233) further includes the location information of the transaction terminal (105), which can be used for location based services. For example, in reporting the transaction initiated via using the predetermined account number (302) at the transaction terminal (105), the merchant (227) may specify the location of the transaction terminal (105) via a mobile device, a mobile application, a map application, or a street address. Thus, the location of the transaction terminal (105) is associated with the merchant ID (305) and/or the transaction terminal (105).

In one embodiment, the data warehouse (149) stores location information of transaction terminal (105) (e.g., as reported by the acquirer processor (147)) and provides the location information to the merchant aggregator (221) after the merchant ID (305) is linked to the merchant identifier (235) via the transaction record (237) for the transaction initiated on the transaction terminal (105).

In one embodiment, during the enrollment process, the merchant aggregator (221) instructs the merchant (227) to perform the transaction according to the data stored in the transaction record (223) and provides the transaction record (233) to the portal (143). In response, the portal (143) generates a trigger record (207) to detect the transaction that is subsequently initiated by the merchant at the transaction terminal (105). In one embodiment, the trigger record (207) is configured to cause the portal (143) to link the merchant ID (305) from the transaction record (237) of the identified transaction with the merchant identifier (235) associated with the transaction record (233) used to generate the trigger record (207).

In one embodiment, during the enrollment process, the merchant aggregator (221) is configured to request the portal (143) to generate a set of transaction parameters to temporarily identify a transaction terminal (105) of a merchant (227). The portal (143) is configured to transmit the parameters to the merchant aggregator as part of the transaction record (233) for initiation of the transaction. Examples of the parameters include the transaction amount, a pseudo-promotional code to be transmitted in an authorization request initiated in the transaction terminal (105). After the parameters are transmitted to the merchant aggregator (221), the transaction handler (103) is configured to monitor transactions to detect the transaction made, in the predetermined account, using the parameters provided to the merchant aggregator (221). Thus, as soon as the authorization request for the expected transaction reaches the transaction handler (103), the portal (143) can identify the merchant ID (305) and/or the transaction terminal ID of the respective transaction terminal (105) from the received authorization request, for association with the transaction terminal (105) of the merchant (227) to be enrolled.

In one embodiment, the transaction handler (103) is configured to monitor and detect a plurality of transactions initiated to enroll a plurality of different merchants and/or different transaction terminals of the enrolled merchants. To separately identify the merchants and/or the transaction terminals, the portal (143) and/or the merchant aggregator (221) are configured to select the transaction parameters (e.g., transaction amounts) as temporary unique identifiers of the merchants and/or transaction terminals. A data warehouse (e.g., 149) is configured to store data associating the temporary unique identifiers with the merchants and/or transaction terminals. After a transaction is performed and detected, the temporary association between the corresponding transaction parameters with the merchants and/or transaction terminals can be removed and/or reused for the identification of further merchants and/or transaction terminals.

In one embodiment, the transaction parameters configured as temporary identifiers of the enrolled merchants and/or transaction terminals are used to create trigger records to detect the subsequent authorization requests initiated from the corresponding transaction terminals of the enrolled merchants.

Figure 13:
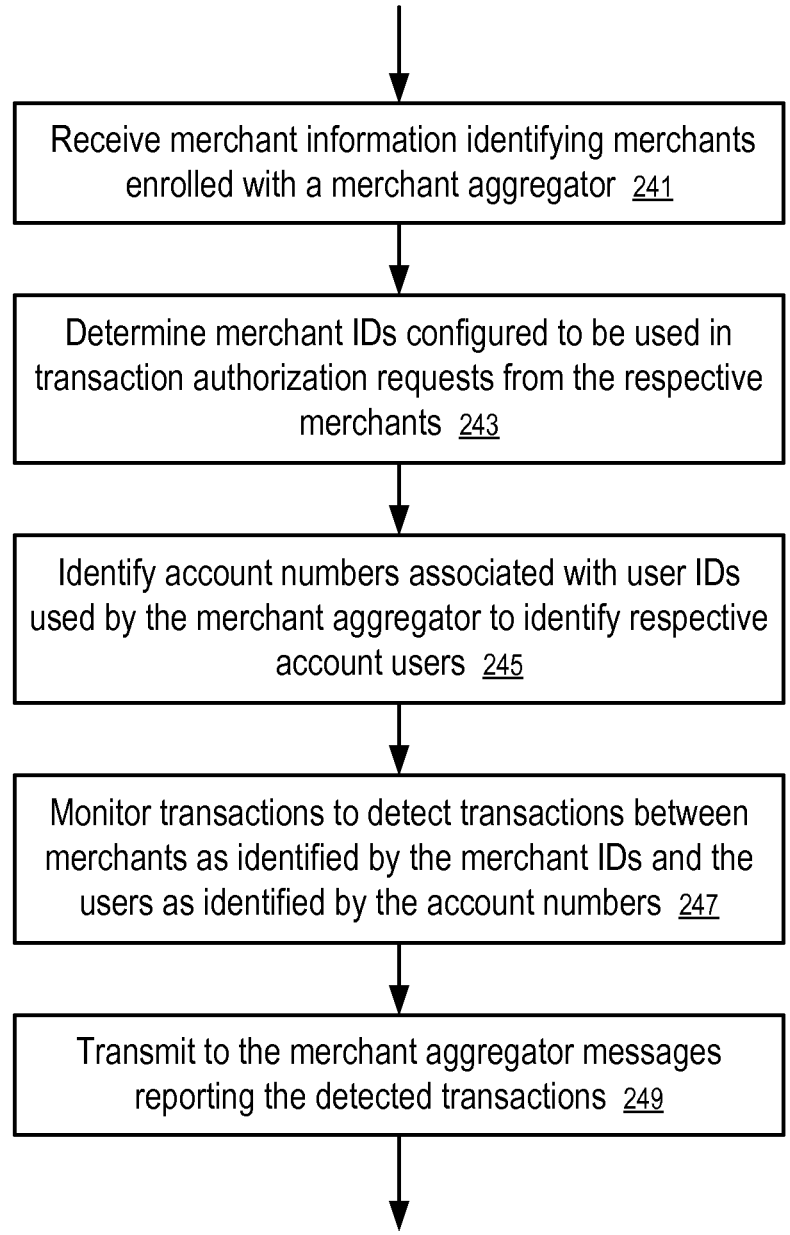
FIG. 13 shows a method to provide real-time notifications of transactions according to one embodiment.

FIG. 13 shows a method to provide real-time notifications of transactions according to one embodiment. In FIG. 13, a computing apparatus is configured to receive (241) merchant information (225) identifying merchants (227) enrolled with a merchant aggregator (221), determine (243) merchant IDs (305) configured to be used in transaction authorization requests from the respective merchants (227), identify (245) account numbers (302) associated with user IDs (223) used by the merchant aggregator (221) to identify respective account users (101), monitor (247) transactions processed by the transactions handler (103) to detect transactions between merchants (227) as identified by the merchant IDs (305) and the users (101) as identified by the account numbers (302), and transmit (249) to the merchant aggregator (221) messages reporting the detected transactions.

In one embodiment, the computing apparatus is configured to: receive first data including a first merchant identifier (235) of a merchant (227); determine, using the first data, a second merchant identifier (305) different from the first merchant identifier and configured to identify the merchant in authorization requests for transactions of the merchant (227) submitted to a transaction handler (103); monitor, using the second merchant identifier (205), transactions of the merchant (227) to detect a subset of the transactions; and in response to detecting a transaction in the subset, transmit a message in real time as the transaction handler (103) processes the transaction, where the message contains information about the transaction and identifies the merchant using the first merchant identifier (235).

In one embodiment, the computing apparatus is configured to store second data associating the first merchant identifier (235) and the second merchant identifier (225), and determine, using the second data, the first merchant identifier (235) for the transaction, after the detecting of the transaction in the subset.

In one embodiment, the message containing information about the detected transaction in the subset is communicated via a communication channel separate from a communication channel used to process authorization of the transaction.

In one embodiment, the message is communicated to a computing device (e.g., merchant aggregator (221)) not involved in authorization of the transaction; and where the computing device (e.g., merchant aggregator (221)) receiving the message is configured to identify the merchant using the first merchant identifier (235), after the merchant (227) is enrolled in a program hosted on the computing device.

In one embodiment, the receiving of the first data identifying the merchant includes: receiving a request associated with the merchant; and computing a transaction amount configured to uniquely identify the merchant among a plurality of merchants in transactions to be made in a predetermined account; and providing the transaction amount as a response to the request. In one embodiment, the request includes the first merchant identifier of the merchant.

In one embodiment, after the providing of the transaction amount as the response to the request, the computing apparatus is configured to: monitor transactions in the predetermined account to detect a first transaction in the predetermined account by matching a transaction amount of the first transaction with the transaction amount provided as a response to the request; and determine the second merchant identifier based on the first transaction, where the first transaction is made in the predetermined account in accordance with the transaction amount that is provided as a response to the request.

In one embodiment, the computing apparatus is configured to store a trigger record for the predetermined account to monitor transactions in the predetermined account in real time as authorization requests for transactions in the predetermined account are processed by the transaction handler.

In one embodiment, the computing apparatus is configured to store third data identifying transaction amounts that have been assigned to represent different merchant identifiers including the first merchant identifier, where each of the transaction amounts uniquely identifies a respective one of the different merchant identifiers of the plurality of merchants; and after the detection of the first transaction, the computing apparatus removes from the third data association between the first merchant identifier and the transaction amount that is provided as a response to the request.

In one embodiment, the computing apparatus is configured to enroll a plurality of account holders to detect the transactions in the subset based at least in part on account numbers of the account holders.

In one embodiment, the determining of the second merchant identifier includes: identifying a transaction record of the first transaction based on matching data contained in the transaction record with the information about the first transaction provided in the first data (e.g., a date of the first transaction, a time of the first transaction, a transaction amount of the first transaction, a location of the merchant); and determining the second merchant identifier based on the transaction record.

In one embodiment, the computing apparatus having at least one processor and memory storing instructions configured to instruct the at least one processor to perform operations. The computing apparatus includes: a portal (143) configured to communicate with a remote computing device (e.g., merchant aggregator (221)) over a communication network to receive first data including a first merchant identifier (235) of the merchant (227); and a transaction handler (103) configured to use a second merchant identifier (305) to identify the merchant in authorization requests for transactions of the merchant (227) submitted from the transaction terminal (105) of the merchant to the transaction handler (103) via the acquirer processor (147) associated with the merchant account (148) of the merchant (227), where the portal (143) is coupled with the transaction handler (103) to determine, using the first data, the second merchant identifier (305) different from the first merchant identifier (235). The computing apparatus further includes a data warehouse (149) configured to store transaction data (109) recording transactions processed by the transaction handler (103) and store second data associating the first merchant identifier (305) and the second merchant identifier (235). The transaction handler (103) is configured via trigger records (207) to monitor, using the second merchant identifier (305), transactions of the merchant (227) to detect the subset of the transactions.

In one embodiment, the computing apparatus further includes a media controller (115) configured to transmit, in response to detecting a transaction in the subset, a message to the remote computing device (e.g., merchant aggregator (221)) in real time as the transaction handler (103) processes the transaction to inform the remote computing device (e.g., merchant aggregator (221)) of the transaction.

In one embodiment, the data warehouse (143) is configured to store third data associating a plurality of suggested transaction amounts with a plurality of different merchant identifiers respectively, where each of the plurality of suggested transaction amounts uniquely identifies a corresponding merchant identifier in the plurality of different merchant identifiers.

In one embodiment, the portal (143) is configured to provide, to the remote computing device in response to the first data, a suggested transaction amount configured to uniquely identify the first merchant identifier in the plurality of different merchant identifiers in the third data. After the portal (143) provides the suggested transaction amount to the remote computing device, the transaction handler is configured to detect an authorization request for the first transaction, made according to the suggested transaction amount, in a predetermined account using a transaction terminal of the merchant, where the second merchant identifier is determined from the authorization request.

In one embodiment, the computing apparatus/system includes at least one of: the portal (143), the data warehouse (149), the transaction handler (103), the medial controller (115), and the message broker (201), each of which may be implemented using a data processing system illustrated in FIG. 7, with more or less components.

Some details about the system in one embodiment are provided in the section entitled "SYSTEM," "CENTRALIZED DATA WAREHOUSE" and "HARDWARE."

Variations

Some embodiments use more or fewer components than those illustrated in FIGS. 1 and 4-7. For example, in one embodiment, the user specific profile (131) is used by a search engine to prioritize search results. In one embodiment, the correlator (117) is to correlate transactions with online activities, such as searching, web browsing, and social networking, instead of or in addition to the user specific advertisement data (119). In one embodiment, the correlator (117) is to correlate transactions and/or spending patterns with news announcements, market changes, events, natural disasters, etc. In one embodiment, the data to be correlated by the correlator with the transaction data (109) may not be personalized via the user specific profile (131) and may not be user specific. In one embodiment, multiple different devices are used at the point of interaction (107) for interaction with the user (101); and some of the devices may not be capable of receiving input from the user (101). In one embodiment, there are transaction terminals (105) to initiate transactions for a plurality of users (101) with a plurality of different merchants. In one embodiment, the account information (142) is provided to the transaction terminal (105) directly (e.g., via phone or Internet) without the use of the account identification device (141).

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

For example, in one embodiment, the entity operating the transaction handler (103) provides the intelligence (e.g., transaction profiles (127) or the user specific profile (131)) for the selection of the advertisement; and a third party (e.g., a web search engine, a publisher, or a retailer) may present the advertisement in a context outside a transaction involving the transaction handler (103) before the advertisement results in a purchase.

For example, in one embodiment, the customer may interact with the third party at the point of interaction (107); and the entity controlling the transaction handler (103) may allow the third party to query for intelligence information (e.g., transaction profiles (127), or the user specific profile (131)) about the customer using the user data (125), thus informing the third party of the intelligence information for targeting the advertisements, which can be more useful, effective and compelling to the user (101). For example, the entity operating the transaction handler (103) may provide the intelligence information without generating, identifying or selecting advertisements; and the third party receiving the intelligence information may identify, select and/or present advertisements.

Through the use of the transaction data (109), account data (111), correlation results (123), the context at the point of interaction, and/or other data, relevant and compelling messages or advertisements can be selected for the customer at the points of interaction (e.g., 107) for targeted advertising. The messages or advertisements are thus delivered at the optimal time for influencing or reinforcing brand perceptions and revenue-generating behavior. The customers receive the advertisements in the media channels that they like and/or use most frequently.

In one embodiment, the transaction data (109) includes transaction amounts, the identities of the payees (e.g., merchants), and the date and time of the transactions. The identities of the payees can be correlated to the businesses, services, products and/or locations of the payees. For example, the transaction handler (103) maintains a database of merchant data, including the merchant locations, businesses, services, products, etc. Thus, the transaction data (109) can be used to determine the purchase behavior, pattern, preference, tendency, frequency, trend, budget and/or propensity of the customers in relation to various types of businesses, services and/or products and in relation to time.

In one embodiment, the products and/or services purchased by the user (101) are also identified by the information transmitted from the merchants or service providers. Thus, the transaction data (109) may include identification of the individual products and/or services, which allows the profile generator (121) to generate transaction profiles (127) with fine granularity or resolution. In one embodiment, the granularity or resolution may be at a level of distinct products and services that can be purchased (e.g., stock-keeping unit (SKU) level), or category or type of products or services, or vendor of products or services, etc.

The profile generator (121) may consolidate transaction data for a person having multiple accounts to derive intelligence information about the person to generate a profile for the person (e.g., transaction profiles (127), or the user specific profile (131)).

The profile generator (121) may consolidate transaction data for a family having multiple accounts held by family members to derive intelligence information about the family to generate a profile for the family (e.g., transaction profiles (127), or the user specific profile (131)).

Similarly, the profile generator (121) may consolidate transaction data for a group of persons, after the group is identified by certain characteristics, such as gender, income level, geographical location or region, preference, characteristics of past purchases (e.g., merchant categories, purchase types), cluster, propensity, demographics, social networking characteristics (e.g., relationships, preferences, activities on social networking websites), etc. The consolidated transaction data can be used to derive intelligence information about the group to generate a profile for the group (e.g., transaction profiles (127), or the user specific profile (131)).

In one embodiment, the profile generator (121) may consolidate transaction data according to the user data (125) to generate a profile specific to the user data (125).

Since the transaction data (109) are records and history of past purchases, the profile generator (121) can derive intelligence information about a customer using an account, a customer using multiple accounts, a family, a company, or other groups of customers, about what the targeted audience is likely to purchase in the future, how frequently, and their likely budgets for such future purchases. Intelligence information is useful in selecting the advertisements that are most useful, effective and compelling to the customer, thus increasing the efficiency and effectiveness of the advertising process.

In one embodiment, the transaction data (109) are enhanced with correlation results (123) correlating past advertisements and purchases that result at least in part from the advertisements. Thus, the intelligence information can be more accurate in assisting with the selection of the advertisements. The intelligence information may not only indicate what the audience is likely to purchase, but also how likely the audience is to be influenced by advertisements for certain purchases, and the relative effectiveness of different forms of advertisements for the audience. Thus, the advertisement selector (133) can select the advertisements to best use the opportunity to communicate with the audience. Further, the transaction data (109) can be enhanced via other data elements, such as program enrollment, affinity programs, redemption of reward points (or other types of offers), online activities, such as web searches and web browsing, social networking information, etc., based on the account data (111) and/or other data, such as non-transactional data discussed in U.S. patent application Ser. No. 12/614,603, filed Nov. 9, 2009, assigned Pub. No. 2011/0054981, and entitled "Analyzing Local Non-Transactional Data with Transactional Data in Predictive Models," the disclosure of which is hereby incorporated herein by reference.

In one embodiment, the entity operating the transaction handler (103) provides the intelligence information in real-time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

In one embodiment, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Examples of user interface systems to manage wish lists are provided in U.S. patent application Ser. No. 12/683,802, filed Jan. 7, 2010, assigned Pub. No. 2010/0174623, and entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data (109) may include transaction records (301); and in one embodiment, an aggregated spending profile (341) is generated from the transaction records (301), in a way illustrated in FIG. 2, to summarize the spending behavior reflected in the transaction records (301).

In one embodiment, each of the transaction records (301) is for a particular transaction processed by the transaction handler (103). Each of the transaction records (301) provides information about the particular transaction, such as the account number (302) of the consumer account (146) used to pay for the purchase, the date (303) (and/or time) of the transaction, the amount (304) of the transaction, the ID (305) of the merchant who receives the payment, the category (306) of the merchant, the channel (307) through which the purchase was made, etc. Examples of channels include online, offline in-store, via phone, etc. In one embodiment, the transaction records (301) may further include a field to identify a type of transaction, such as card-present, card-not-present, etc.

In one embodiment, a "card-present" transaction involves physically presenting the account identification device (141), such as a financial transaction card, to the merchant (e.g., via swiping a credit card at a POS terminal of a merchant); and a "card-not-present" transaction involves presenting the account information (142) of the consumer account (146) to the merchant to identify the consumer account (146) without physically presenting the account identification device (141) to the merchant or the transaction terminal (105).

In one embodiment, certain information about the transaction can be looked up in a separate database based on other information recorded for the transaction. For example, a database may be used to store information about merchants, such as the geographical locations of the merchants, categories of the merchants, etc. Thus, the corresponding merchant information related to a transaction can be determined using the merchant ID (305) recorded for the transaction.

In one embodiment, the transaction records (301) may further include details about the products and/or services involved in the purchase. For example, a list of items purchased in the transaction may be recorded together with the respective purchase prices of the items and/or the respective quantities of the purchased items. The products and/or services can be identified via stock-keeping unit (SKU) numbers, or product category IDs. The purchase details may be stored in a separate database and be looked up based on an identifier of the transaction.

When there is voluminous data representing the transaction records (301), the spending patterns reflected in the transaction records (301) can be difficult to recognize by an ordinary person.

In one embodiment, the voluminous transaction records (301) are summarized (335) into aggregated spending profiles (e.g., 341) to concisely present the statistical spending characteristics reflected in the transaction records (301). The aggregated spending profile (341) uses values derived from statistical analysis to present the statistical characteristics of transaction records (301) of an entity in a way easy to understand by an ordinary person.

In FIG. 2, the transaction records (301) are summarized (335) via factor analysis (327) to condense the variables (e.g., 313, 315) and via cluster analysis (329) to segregate entities by spending patterns.

In FIG. 2, a set of variables (e.g., 311, 313, 315) are defined based on the parameters recorded in the transaction records (301). The variables (e.g., 311, 313, and 315) are defined in a way to have meanings easily understood by an ordinary person. For example, variables (311) measure the aggregated spending in super categories; variables (313) measure the spending frequencies in various areas; and variables (315) measure the spending amounts in various areas. In one embodiment, each of the areas is identified by a merchant category (306) (e.g., as represented by a merchant category code (MCC), a North American Industry Classification System (NAICS) code, or a similarly standardized category code). In other embodiments, an area may be identified by a product category, a SKU number, etc.

In one embodiment, a variable of a same category (e.g., frequency (313) or amount (315)) is defined to be aggregated over a set of mutually exclusive areas. A transaction is classified in only one of the mutually exclusive areas. For example, in one embodiment, the spending frequency variables (313) are defined for a set of mutually exclusive merchants or merchant categories. Transactions falling with the same category are aggregated.

Examples of the spending frequency variables (313) and spending amount variables (315) defined for various merchant categories (e.g., 306) in one embodiment are provided in U.S. patent application Ser. No. 12/537,566, filed Aug. 7, 2009, published as U.S. Pat. App. Pub. No. 2010/0306029 and entitled "Cardholder Clusters," and in U.S. patent application Ser. No. 12/777,173, filed May 10, 2010, published as U.S. Pat. App. Pub. No. 2010/0306032 and entitled "Systems and Methods to Summarize Transaction Data," the disclosures of which applications are hereby incorporated herein by reference.

In one embodiment, super categories (311) are defined to group the categories (e.g., 306) used in transaction records (301). The super categories (311) can be mutually exclusive. For example, each merchant category (306) is classified under only one super merchant category but not any other super merchant categories. Since the generation of the list of super categories typically requires deep domain knowledge about the businesses of the merchants in various categories, super categories (311) are not used in one embodiment.

In one embodiment, the aggregation (317) includes the application of the definitions (309) for these variables (e.g., 311, 313, and 315) to the transaction records (301) to generate the variable values (321). The transaction records (301) are aggregated to generate aggregated measurements (e.g., variable values (321)) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation (317) can be performed for a particular time period and for entities at various levels.

In one embodiment, the transaction records (301) are aggregated according to a buying entity. The aggregation (317) can be performed at account level, person level, family level, company level, neighborhood level, city level, region level, etc. to analyze the spending patterns across various areas (e.g., sellers, products or services) for the respective aggregated buying entity. For example, the transaction records (301) for a particular account (e.g., presented by the account number (302)) can be aggregated for an account level analysis. To aggregate the transaction records (301) in account level, the transactions with a specific merchant or merchants in a specific category are counted according to the variable definitions (309) for a particular account to generate a frequency measure (e.g., 313) for the account relative to the specific merchant or merchant category; and the transaction amounts (e.g., 304) with the specific merchant or the specific category of merchants are summed for the particular account to generate an average spending amount for the account relative to the specific merchant or merchant category. For example, the transaction records (301) for a particular person having multiple accounts can be aggregated for a person level analysis, the transaction records (301) aggregated for a particular family for a family level analysis, and the transaction records (301) for a particular business aggregated for a business level analysis.

The aggregation (317) can be performed for a predetermined time period, such as for the transactions occurring in the past month, in the past three months, in the past twelve months, etc.

In another embodiment, the transaction records (301) are aggregated according to a selling entity. The spending patterns at the selling entity across various buyers, products or services can be analyzed. For example, the transaction records (301) for a particular merchant having transactions with multiple accounts can be aggregated for a merchant level analysis. For example, the transaction records (301) for a particular merchant group can be aggregated for a merchant group level analysis.

In one embodiment, the aggregation (317) is formed separately for different types of transactions, such as transactions made online, offline, via phone, and/or "card-present" transactions vs. "card-not-present" transactions, which can be used to identify the spending pattern differences among different types of transactions.

In one embodiment, the variable values (e.g., 323, 324, ..., 325) associated with an entity ID (322) are considered the random samples of the respective variables (e.g., 311, 313, 315), sampled for the instance of an entity represented by the entity ID (322). Statistical analyses (e.g., factor analysis (327) and cluster analysis (329)) are performed to identify the patterns and correlations in the random samples.

For example, a cluster analysis (329) can identify a set of clusters and thus cluster definitions (333) (e.g., the locations of the centroids of the clusters). In one embodiment, each entity ID (322) is represented as a point in a mathematical space defined by the set of variables; and the variable values (323, 324, ..., 325) of the entity ID (322) determine the coordinates of the point in the space and thus the location of the point in the space. Various points may be concentrated in various regions; and the cluster analysis (329) is configured to formulate the positioning of the points to drive the clustering of the points. In other embodiments, the cluster analysis (329) can also be performed using the techniques of Self Organizing Maps (SOM), which can identify and show clusters of multi-dimensional data using a representation on a two-dimensional map.

Once the cluster definitions (333) are obtained from the cluster analysis (329), the identity of the cluster (e.g., cluster ID (343)) that contains the entity ID (322) can be used to characterize spending behavior of the entity represented by the entity ID (322). The entities in the same cluster are considered to have similar spending behaviors.

Similarities and differences among the entities, such as accounts, individuals, families, etc., as represented by the entity ID (e.g., 322) and characterized by the variable values (e.g., 323, 324, ..., 325) can be identified via the cluster analysis (329). In one embodiment, after a number of clusters of entity IDs are identified based on the patterns of the aggregated measurements, a set of profiles can be generated for the clusters to represent the characteristics of the clusters. Once the clusters are identified, each of the entity IDs (e.g., corresponding to an account, individual, family) can be assigned to one cluster; and the profile for the corresponding cluster may be used to represent, at least in part, the entity (e.g., account, individual, family). Alternatively, the relationship between an entity (e.g., an account, individual, family) and one or more clusters can be determined (e.g., based on a measurement of closeness to each cluster). Thus, the cluster related data can be used in a transaction profile (127 or 341) to provide information about the behavior of the entity (e.g., an account, an individual, a family).

In one embodiment, more than one set of cluster definitions (333) is generated from cluster analyses (329). For example, cluster analyses (329) may generate different sets of cluster solutions corresponding to different numbers of identified clusters. A set of cluster IDs (e.g., 343) can be used to summarize (335) the spending behavior of the entity represented by the entity ID (322), based on the typical spending behavior of the respective clusters. In one example, two cluster solutions are obtained; one of the cluster solutions has 17 clusters, which classify the entities in a relatively coarse manner; and the other cluster solution has 55 clusters, which classify the entities in a relative fine manner. A cardholder can be identified by the spending behavior of one of the 17 clusters and one of the 55 clusters in which the cardholder is located. Thus, the set of cluster IDs corresponding to the set of cluster solutions provides a hierarchical identification of an entity among clusters of different levels of resolution. The spending behavior of the clusters is represented by the cluster definitions (333), such as the parameters (e.g., variable values) that define the centroids of the clusters.

In one embodiment, the random variables (e.g., 313 and 315) as defined by the definitions (309) have certain degrees of correlation and are not independent from each other. For example, merchants of different merchant categories (e.g., 306) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user (101) from making a purchase from another merchant). Such relationships may be complex and difficult to quantify by merely inspecting the categories. Further, such relationships may shift over time as the economy changes.

In one embodiment, a factor analysis (327) is performed to reduce the redundancy and/or correlation among the variables (e.g., 313, 315). The factor analysis (327) identifies the definitions (331) for factors, each of which represents a combination of the variables (e.g., 313, 315).

In one embodiment, a factor is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions (331) are obtained from the factor analysis (327), the factor definitions (331) can be applied to the variable values (321) to determine factor values (344) for the aggregated spending profile (341). Since redundancy and correlation are reduced in the factors, the number of factors is typically much smaller than the number of the original variables (e.g., 313, 315). Thus, the factor values (344) represent the concise summary of the original variables (e.g., 313, 315).

For example, there may be thousands of variables on spending frequency and amount for different merchant categories; and the factor analysis (327) can reduce the factor number to less than one hundred (and even less than twenty). In one example, a twelve-factor solution is obtained, which allows the use of twelve factors to combine the thousands of the original variables (313, 315); and thus, the spending behavior in thousands of merchant categories can be summarized via twelve factor values (344). In one embodiment, each factor is combination of at least four variables; and a typical variable has contributions to more than one factor.

In one example, hundreds or thousands of transaction records (301) of a cardholder are converted into hundreds or thousands of variable values (321) for various merchant categories, which are summarized (335) via the factor definitions (331) and cluster definitions (333) into twelve factor values (344) and one or two cluster IDs (e.g., 343). The summarized data can be readily interpreted by a human to ascertain the spending behavior of the cardholder. A user (101) may easily specify a spending behavior requirement formulated based on the factor values (344) and the cluster IDs (e.g., to query for a segment of customers, or to request the targeting of a segment of customers). The reduced size of the summarized data reduces the need for data communication bandwidth for communicating the spending behavior of the cardholder over a network connection and allows simplified processing and utilization of the data representing the spending behavior of the cardholder.

In one embodiment, the behavior and characteristics of the clusters are studied to identify a description of a type of representative entities that are found in each of the clusters. The clusters can be named based on the type of representative entities to allow an ordinary person to easily understand the typical behavior of the clusters.

In one embodiment, the behavior and characteristics of the factors are also studied to identify dominant aspects of each factor. The clusters can be named based on the dominant aspects to allow an ordinary person to easily understand the meaning of a factor value.

In FIG. 2, an aggregated spending profile (341) for an entity represented by an entity ID (e.g., 322) includes the cluster ID (343) and factor values (344) determined based on the cluster definitions (333) and the factor definitions (331). The aggregated spending profile (341) may further include other statistical parameters, such as diversity index (342), channel distribution (345), category distribution (346), zip code (347), etc., as further discussed below.

In one embodiment, the diversity index (342) may include an entropy value and/or a Gini coefficient, to represent the diversity of the spending by the entity represented by the entity ID (322) across different areas (e.g., different merchant categories (e.g., 306)). When the diversity index (342) indicates that the diversity of the spending data is under a predetermined threshold level, the variable values (e.g., 323, 324, . . . , 325) for the corresponding entity ID (322) may be excluded from the cluster analysis (329) and/or the factor analysis (327) due to the lack of diversity. When the diversity index (342) of the aggregated spending profile (341) is lower than a predetermined threshold, the factor values (344) and the cluster ID (343) may not accurately represent the spending behavior of the corresponding entity.

In one embodiment, the channel distribution (345) includes a set of percentage values that indicate the percentages of amounts spent in different purchase channels, such as online, via phone, in a retail store, etc.

In one embodiment, the category distribution (346) includes a set of percentage values that indicate the percentages of spending amounts in different super categories (311). In one embodiment, thousands of different merchant categories (e.g., 306) are represented by Merchant Category Codes (MCC), or North American Industry Classification System (NAICS) codes in transaction records (301). These merchant categories (e.g., 306) are classified or combined into less than one hundred super categories (or less than twenty). In one example, fourteen super categories are defined based on domain knowledge.

In one embodiment, the aggregated spending profile (341) includes the aggregated measurements (e.g., frequency, average spending amount) determined for a set of predefined, mutually exclusive merchant categories (e.g., super categories (311)). Each of the super merchant categories represents a type of products or services a customer may purchase. A transaction profile (127 or 341) may include the aggregated measurements for each of the set of mutually exclusive merchant categories. The aggregated measurements determined for the predefined, mutually exclusive merchant categories can be used in transaction profiles (127 or 341) to provide information on the behavior of a respective entity (e.g., an account, an individual, or a family).

In one embodiment, the zip code (347) in the aggregated spending profile (341) represents the dominant geographic area in which the spending associated with the entity ID (322) occurred. Alternatively or in combination, the aggregated spending profile (341) may include a distribution of transaction amounts over a set of zip codes that account for a majority of the transactions or transaction amounts (e.g., 90%).

In one embodiment, the factor analysis (327) and cluster analysis (329) are used to summarize the spending behavior across various areas, such as different merchants characterized by merchant category (306), different products and/or services, different consumers, etc. The aggregated spending profile (341) may include more or fewer fields than those illustrated in FIG. 2. For example, in one embodiment, the aggregated spending profile (341) further includes an aggregated spending amount for a period of time (e.g., the past twelve months); in another embodiment, the aggregated spending profile (341) does not include the category distribution (346); and in a further embodiment, the aggregated spending profile (341) may include a set of distance measures to the centroids of the clusters. The distance measures may be defined based on the variable values (323, 324, . . . , 325), or based on the factor values (344). The factor values of the centroids of the clusters may be estimated based on the entity ID (e.g., 322) that is closest to the centroid in the respective cluster.

Other variables can be used in place of, or in additional to, the variables (311, 313, 315) illustrated in FIG. 2. For example, the aggregated spending profile (341) can be generated using variables measuring shopping radius/distance from the primary address of the account holder to the merchant site for offline purchases. When such variables are used, the transaction patterns can be identified based at least in part on clustering according to shopping radius/distance and geographic regions. Similarly, the factor definition (331) may include the consideration of the shopping radius/distance. For example, the transaction records (301) may be aggregated based on the ranges of shopping radius/distance and/or geographic regions. For example, the factor analysis can be used to determine factors that naturally combine geographical areas based on the correlations in the spending patterns in various geographical areas.

In one embodiment, the aggregation (317) may involve the determination of a deviation from a trend or pattern. For example, an account makes a certain number of purchases a week at a merchant over the past 6 months. However, in the past 2 weeks the number of purchases is less than the average number per week. A measurement of the deviation from the trend or pattern can be used (e.g., in a transaction profile (127 or 341) as a parameter, or in variable definitions (309) for the factor analysis (327) and/or the cluster analysis) to define the behavior of an account, an individual, a family, etc.

FIG. 3 shows a method to generate an aggregated spending profile according to one embodiment. In FIG. 3, computation models are established (351) for variables (e.g., 311, 313, and 315). In one embodiment, the variables are defined in a way to capture certain aspects of the spending statistics, such as frequency, amount, etc.

In FIG. 3, data from related accounts are combined (353). For example, when an account number change has occurred for a cardholder in the time period under analysis, the transaction records (301) under the different account numbers of the same cardholder are combined under one account number that represents the cardholder. For example, when the analysis is performed at a person level (or family level, business level, social group level, city level, or region level), the transaction records (301) in different accounts of the person (or family, business, social group, city or region) can be combined under one entity ID (322) that represents the person (or family, business, social group, city or region).

In one embodiment, recurrent/installment transactions are combined (355). For example, multiple monthly payments may be combined and considered as one single purchase.

In FIG. 3, account data are selected (357) according to a set of criteria related to activity, consistency, diversity, etc.

For example, when a cardholder uses a credit card solely to purchase gas, the diversity of the transactions by the cardholder is low. In such a case, the transactions in the account of the cardholder may not be statistically meaningful to represent the spending pattern of the cardholder in various merchant categories. Thus, in one embodiment, if the diversity of the transactions associated with an entity ID (322) is below a threshold, the variable values (e.g., 323, 324, . . . , 325) corresponding to the entity ID (322) are not used in the cluster analysis (329) and/or the factor analysis (327). The diversity can be examined based on the diversity index (342) (e.g., entropy or Gini coefficient), or based on counting the different merchant categories in the transactions associated with the entity ID (322); and when the count of different merchant categories is fewer than a threshold (e.g., 5), the transactions associated with the entity ID (322) are not used in the cluster analysis (329) and/or the factor analysis (327) due to the lack of diversity.

For example, when a cardholder uses a credit card only sporadically (e.g., when running out of cash), the limited transactions by the cardholder may not be statistically meaningful in representing the spending behavior of the cardholder. Thus, in one embodiment, when the numbers of transactions associated with an entity ID (322) is below a threshold, the variable values (e.g., 323, 324, . . . , 325) corresponding to the entity ID (322) are not used in the cluster analysis (329) and/or the factor analysis (327).

For example, when a cardholder has only used a credit card during a portion of the time period under analysis, the transaction records (301) during the time period may not reflect the consistent behavior of the cardholder for the entire time period. Consistency can be checked in various ways. In one example, if the total number of transactions during the first and last months of the time period under analysis is zero, the transactions associated with the entity ID (322) are inconsistent in the time period and thus are not used in the cluster analysis (329) and/or the factor analysis (327). Other criteria can be formulated to detect inconsistency in the transactions.

In FIG. 3, the computation models (e.g., as represented by the variable definitions (309)) are applied (359) to the remaining account data (e.g., transaction records (301)) to obtain data samples for the variables. The data points associated with the entities, other than those whose transactions fail to meet the minimum requirements for activity, consistency, diversity, etc., are used in factor analysis (327) and cluster analysis (329).

In FIG. 3, the data samples (e.g., variable values (321)) are used to perform (361) factor analysis (327) to identify factor solutions (e.g., factor definitions (331)). The factor solutions can be adjusted (363) to improve similarity in factor values of different sets of transaction data (109). For example, factor definitions (331) can be applied to the transactions in the time period under analysis (e.g., the past twelve months) and be applied separately to the transactions in a prior time period (e.g., the twelve months before the past twelve months) to obtain two sets of factor values. The factor definitions (331) can be adjusted to improve the correlation between the two set of factor values.

The data samples can also be used to perform (365) cluster analysis (329) to identify cluster solutions (e.g., cluster definitions (333)). The cluster solutions can be adjusted (367) to improve similarity in cluster identifications based on different sets of transaction data (109). For example, cluster definitions (333) can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions (333) can be adjusted to improve the correlation between the two set of cluster identifications.

In one embodiment, the number of clusters is determined from clustering analysis. For example, a set of cluster seeds can be initially identified and used to run a known clustering algorithm. The sizes of data points in the clusters are then examined. When a cluster contains less than a predetermined number of data points, the cluster may be eliminated to rerun the clustering analysis.

In one embodiment, standardizing entropy is added to the cluster solution to obtain improved results.

In one embodiment, human understandable characteristics of the factors and clusters are identified (369) to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis (327) and the cluster analysis (329) are performed periodically (e.g., once a year, or six months) to update the factor definitions (331) and the cluster definitions (333), which may change as the economy and the society change over time.

In FIG. 3, transaction data (109) are summarized (371) using the factor solutions and cluster solutions to generate the aggregated spending profile (341). The aggregated spending profile (341) can be updated more frequently than the factor solutions and cluster solutions, when the new transaction data (109) becomes available. For example, the aggregated spending profile (341) may be updated quarterly or monthly.

Various tweaks and adjustments can be made for the variables (e.g., 313, 315) used for the factor analysis (327) and the cluster analysis (329). For example, the transaction records (301) may be filtered, weighted or constrained, according to different rules to improve the capabilities of the aggregated measurements in indicating certain aspects of the spending behavior of the customers.

For example, in one embodiment, the variables (e.g., 313, 315) are normalized and/or standardized (e.g., using statistical average, mean, and/or variance).

For example, the variables (e.g., 313, 315) for the aggregated measurements can be tuned, via filtering and weighting, to predict the future trend of spending behavior (e.g., for advertisement selection), to identify abnormal behavior (e.g., for fraud prevention), or to identify a change in spending pattern (e.g., for advertisement audience measurement), etc. The aggregated measurements, the factor values (344), and/or the cluster ID (343) generated from the aggregated measurements can be used in a transaction profile (127 or 341) to define the behavior of an account, an individual, a family, etc.

In one embodiment, the transaction data (109) are aged to provide more weight to recent data than older data. In other embodiments, the transaction data (109) are reverse aged. In further embodiments, the transaction data (109) are seasonally adjusted.

In one embodiment, the variables (e.g., 313, 315) are constrained to eliminate extreme outliers. For example, the minimum values and the maximum values of the spending amounts (315) may be constrained based on values at certain percentiles (e.g., the value at one percentile as the minimum and the value at 99 percentile as the maximum) and/or certain predetermined values. In one embodiment, the spending frequency variables (313) are constrained based on values at certain percentiles and median values. For example, the minimum value for a spending frequency variable (313) may be constrained at $P_1-k\times(M-P_1)$, where $P_1$ is the one percentile value, M the median value, and k a predetermined constant (e.g., 0.1). For example, the maximum value for a spending frequency variable (313) may be constrained at $P_{99}+a\times(P_{99}-M)$, where $P_{99}$ is the 99 percentile value, M the median value, and k a predetermined constant (e.g., 0.1).

In one embodiment, variable pruning is performed to reduce the number of variables (e.g., 313, 315) that have less impact on cluster solutions and/or factor solutions. For example, variables with standard variation less than a predetermined threshold (e.g., 0.1) may be discarded for the purpose of cluster analysis (329). For example, analysis of variance (ANOVA) can be performed to identify and remove variables that are no more significant than a predetermined threshold.

The aggregated spending profile (341) can provide information on spending behavior for various application areas, such as marketing, fraud detection and prevention, creditworthiness assessment, loyalty analytics, targeting of offers, etc.

For example, clusters can be used to optimize offers for various groups within an advertisement campaign. The use of factors and clusters to target advertisement can improve the speed of producing targeting models. For example, using variables based on factors and clusters (and thus eliminating the need to use a large number of convention variables) can improve predictive models and increase efficiency of targeting by reducing the number of variables examined. The variables formulated based on factors and/or clusters can be used with other variables to build predictive models based on spending behaviors.

In one embodiment, the aggregated spending profile (341) can be used to monitor risks in transactions. Factor values are typically consistent over time for each entity. An abrupt change in some of the factor values may indicate a change in financial conditions, or a fraudulent use of the account. Models formulated using factors and clusters can be used to identify a series of transactions that do not follow a normal pattern specified by the factor values (344) and/or the cluster ID (343). Potential bankruptcies can be predicted by analyzing the change of factor values over time; and significant changes in spending behavior may be detected to stop and/or prevent fraudulent activities.

For example, the factor values (344) can be used in regression models and/or neural network models for the detection of certain behaviors or patterns. Since factors are relatively non-collinear, the factors can work well as independent variables. For example, factors and clusters can be used as independent variables in tree models.

For example, surrogate accounts can be selected for the construction of a quasi-control group. For example, for a given account A that is in one cluster, the account B that is closest to the account A in the same cluster can be selected as a surrogate account of the account B. The closeness can be determined by certain values in the aggregated spending profile (341), such as factor values (344), category distribution (346), etc. For example, a Euclidian distance defined based on the set of values from the aggregated spending profile (341) can be used to compare the distances between the accounts. Once identified, the surrogate account can be used to reduce or eliminate bias in measurements. For example, to determine the effect of an advertisement, the spending pattern response of the account A that is exposed to the advertisement can be compared to the spending pattern response of the account B that is not exposed to the advertisement.

For example, the aggregated spending profile (341) can be used in segmentation and/or filtering analysis, such as selecting cardholders having similar spending behaviors identified via factors and/or clusters for targeted advertisement campaigns, and selecting and determining a group of merchants that could be potentially marketed towards cardholders originating in a given cluster (e.g., for bundled offers). For example, a query interface can be provided to allow the query to identify a targeted population based on a set of criteria formulated using the values of clusters and factors.

For example, the aggregated spending profile (341) can be used in a spending comparison report, such as comparing a sub-population of interest against the overall population, determining how cluster distributions and mean factor values differ, and building reports for merchants and/or issuers for benchmarking purposes. For example, reports can be generated according to clusters in an automated way for the merchants. For example, the aggregated spending profile (341) can be used in geographic reports by identifying geographic areas where cardholders shop most frequently and comparing predominant spending locations with cardholder residence locations.

In one embodiment, the profile generator (121) provides affinity relationship data in the transaction profiles (127) so that the transaction profiles (127) can be shared with business partners without compromising the privacy of the users (101) and the transaction details.

For example, in one embodiment, the profile generator (121) is to identify clusters of entities (e.g., accounts, cardholders, families, businesses, cities, regions, etc.) based on the spending patterns of the entities. The clusters represent entity segments identified based on the spending patterns of the entities reflected in the transaction data (109) or the transaction records (301).

In one embodiment, the clusters correspond to cells or regions in the mathematical space that contain the respective groups of entities. For example, the mathematical space representing the characteristics of users (101) may be divided into clusters (cells or regions). For example, the cluster analysis (329) may identify one cluster in the cell or region that contains a cluster of entity IDs (e.g., 322) in the space having a plurality of dimensions corresponding to the variables (e.g., 313 and 315). For example, a cluster can also be identified as a cell or region in a space defined by the factors using the factor definitions (331) generated from the factor analysis (327).

In one embodiment, the parameters used in the aggregated spending profile (341) can be used to define a segment or a cluster of entities. For example, a value for the cluster ID (343) and a set of ranges for the factor values (344) and/or other values can be used to define a segment.

In one embodiment, a set of clusters are standardized to represent the predilection of entities in various groups for certain products or services. For example, a set of standardized clusters can be formulated for people who have shopped, for example, at home improvement stores. The cardholders in the same cluster have similar spending behavior.

In one embodiment, the tendency or likelihood of a user (101) being in a particular cluster (i.e. the user's affinity to the cell) can be characterized using a value, based on past purchases. The same user (101) may have different affinity values for different clusters.

For example, a set of affinity values can be computed for an entity, based on the transaction records (301), to indicate the closeness or predilection of the entity to the set of standardized clusters. For example, a cardholder who has a first value representing affinity of the cardholder to a first cluster may have a second value representing affinity of the cardholder to a second cluster. For example, if a consumer buys a lot of electronics, the affinity value of the consumer to the electronics cluster is high.

In one embodiment, other indicators are formulated across the merchant community and cardholder behavior and provided in the profile (e.g., 127 or 341) to indicate the risk of a transaction.

In one embodiment, the relationship of a pair of values from two different clusters provides an indication of the likelihood that the user (101) is in one of the two cells, if the user (101) is shown to be in the other cell. For example, if the likelihood of the user (101) to purchase each of two types of products is known, the scores can be used to determine the likelihood of the user (101) buying one of the two types of products if the user (101) is known to be interested in the other type of products. In one embodiment, a map of the values for the clusters is used in a profile (e.g., 127 or 341) to characterize the spending behavior of the user (101) (or other types of entities, such as a family, company, neighborhood, city, or other types of groups defined by other aggregate parameters, such as time of day, etc.).

In one embodiment, the clusters and affinity information are standardized to allow sharing between business partners, such as transaction processing organizations, search providers, and marketers. Purchase statistics and search statistics are generally described in different ways. For example, purchase statistics are based on merchants, merchant categories, SKU numbers, product descriptions, etc.; and search statistics are based on search terms. Once the clusters are standardized, the clusters can be used to link purchase information based merchant categories (and/or SKU numbers, product descriptions) with search information based on search terms. Thus, search predilection and purchase predilection can be mapped to each other.

In one embodiment, the purchase data and the search data (or other third party data) are correlated based on mapping to the standardized clusters (cells or segments). The purchase data and the search data (or other third party data) can be used together to provide benefits or offers (e.g., coupons) to consumers. For example, standardized clusters can be used as a marketing tool to provide relevant benefits, including coupons, statement credits, or the like to consumers who are within or are associated with common clusters. For example, a data exchange apparatus may obtain cluster data based on consumer search engine data and actual payment transaction data to identify like groups of individuals who may respond favorably to particular types of benefits, such as coupons and statement credits.

Details about aggregated spending profile (341) in one embodiment are provided in U.S. patent application Ser. No. 12/777,173, filed May 10, 2010, assigned Pub. No. 2010/0306032, and entitled "Systems and Methods to Summarize Transaction Data," the disclosure of which is hereby incorporated herein by reference.

Transaction Data Based Portal

In FIG. 1, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

Over a period of time, the transaction handler (103) accumulates the transaction data (109) from transactions initiated at different transaction terminals (e.g., 105) for different users (e.g., 101). The transaction data (109) thus includes information on purchases made by various users (e.g., 101) at various times via different purchases options (e.g., online purchase, offline purchase from a retail store, mail order, order via phone, etc.)

In one embodiment, the accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

FIG. 4 shows a system to provide information based on transaction data (109) according to one embodiment. In FIG. 4, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127) or aggregated spending profile (341). The portal (143) may be implemented as a web portal, a telephone gateway, a file/data server, etc.

In one embodiment, the portal (143) is configured to receive queries identifying search criteria from the profile selector (129), the advertisement selector (133) and/or third parties and in response, to provide transaction-based intelligence requested by the queries.

For example, in one embodiment, a query is to specify a plurality of account holders to request the portal (143) to deliver the transaction profiles (127) of account holders in a batch mode.

For example, in one embodiment, a query is to identify the user (101) to request the user specific profile (131), or the aggregated spending profile (341), of the user (101). The user (101) may be identified using the account data (111), such as the account number (302), or the user data (125) such as browser cookie ID, IP address, etc.

For example, in one embodiment, a query is to identify a retail location; and the portal (143) is to provide a profile (e.g., 341) that summarizes the aggregated spending patterns of users who have shopped at the retail location within a period of time.

For example, in one embodiment, a query is to identify a geographical location; and the portal (143) is to provide a profile (e.g., 341) that summarizes the aggregated spending patterns of users who have been to, or who are expected to visit, the geographical location within a period of time (e.g., as determined or predicted based on the locations of the point of interactions (e.g., 107) of the users).

For example, in one embodiment, a query is to identify a geographical area; and the portal (143) is to provide a profile (e.g., 341) that summarizes the aggregated spending patterns of users who reside in the geographical area (e.g., as determined by the account data (111), or who have made transactions within the geographical area with a period of time (e.g., as determined by the locations of the transaction terminals (e.g., 105) used to process the transactions).

In one embodiment, the portal (143) is configured to register certain users (101) for various programs, such as a loyalty program to provide rewards and/or offers to the users (101).

In one embodiment, the portal (143) is to register the interest of users (101), or to obtain permissions from the users (101) to gather further information about the users (101), such as data capturing purchase details, online activities, etc.

In one embodiment, the user (101) may register via the issuer; and the registration data in the consumer account (146) may propagate to the data warehouse (149) upon approval from the user (101).

In one embodiment, the portal (143) is to register merchants and provide services and/or information to merchants.

In one embodiment, the portal (143) is to receive information from third parties, such as search engines, merchants, websites, etc. The third party data can be correlated with the transaction data (109) to identify the relationships between purchases and other events, such as searches, news announcements, conferences, meetings, etc., and improve the prediction capability and accuracy.

In FIG. 4, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

In one embodiment, the account identification device (141) is a plastic card having a magnetic strip storing account information (142) identifying the consumer account (146) and/or the issuer processor (145). Alternatively, the account identification device (141) is a smartcard having an integrated circuit chip storing at least the account information (142). In one embodiment, the account identification device (141) includes a mobile phone having an integrated smartcard.

In one embodiment, the account information (142) is printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

In one embodiment, the transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

In one embodiment, the transaction handler (103), the issuer processor (145), and the acquirer processor (147) may each include a subsystem to identify the risk in the transaction and may reject the transaction based on the risk assessment.

In one embodiment, the account identification device (141) includes security features to prevent unauthorized uses of the consumer account (146), such as a logo to show the authenticity of the account identification device (141), encryption to protect the account information (142), etc.

In one embodiment, the transaction terminal (105) is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In one embodiment, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. In one embodiment, dedicated communication channels are used between the transaction handler (103) and the issuer processor (145), between the transaction handler (103) and the acquirer processor (147), and/or between the portal (143) and the transaction handler (103).

In one embodiment, the transaction handler (103) uses the data warehouse (149) to store the records about the transactions, such as the transaction records (301) or transaction data (109). In one embodiment, the transaction handler (103) includes a powerful computer, or cluster of computers functioning as a unit, controlled by instructions stored on a computer readable medium.

In one embodiment, the transaction handler (103) is configured to support and deliver authorization services, exception file services, and clearing and settlement services. In one embodiment, the transaction handler (103) has a subsystem to process authorization requests and another subsystem to perform clearing and settlement services.

In one embodiment, the transaction handler (103) is configured to process different types of transactions, such credit card transactions, debit card transactions, prepaid card transactions, and other types of commercial transactions.

In one embodiment, the transaction handler (103) facilitates the communications between the issuer processor (145) and the acquirer processor (147).

In one embodiment, the transaction handler (103) is coupled to the portal (143) (and/or the profile selector (129), the advertisement selector (133), the media controller (115)) to charge the fees for the services of providing the transaction-based intelligence information and/or advertisement.

For example, in one embodiment, the system illustrated in FIG. 1 is configured to deliver advertisements to the point of interaction (107) of the user (101), based on the transaction-based intelligence information; and the transaction handler (103) is configured to charge the advertisement fees to the account of the advertiser in communication with the issuer processor in control of the account of the advertiser. The advertisement fees may be charged in response to the presentation of the advertisement, or in response to the completion of a pre-determined number of presentations, or in response to a transaction resulted from the presentation of the advertisement. In one embodiment, the transaction handler (103) is configured to a periodic fee (e.g., monthly fee, annual fee) to the account of the advertiser in communication with the respective issuer processor that is similar to the issuer processor (145) of the consumer account (146).

For example, in one embodiment, the portal (143) is configured to provide transaction-based intelligence information in response to the queries received in the portal (143). The portal (143) is to identify the requesters (e.g., via an authentication, or the address of the requesters) and instruct the transaction handler (103) to charge the consumer accounts (e.g., 146) of the respective requesters for the transaction-based intelligence information. In one embodiment, the accounts of the requesters are charged in response to the delivery of the intelligence information via the portal (143). In one embodiment, the accounts of the requesters are charged a periodic subscription fee for the access to the query capability of the portal (143).

In one embodiment, the information service provided by the system illustrated in FIG. 1 includes multiple parties, such as one entity operating the transaction handler (103), one entity operating the advertisement data (135), one entity operating the user tracker (113), one entity operating the media controller (115), etc. The transaction handler (103) is used to generate transactions to settle the fees, charges and/or divide revenues using the accounts of the respective parties. In one embodiment, the account information of the parties is stored in the data warehouse (149) coupled to the transaction handler (103). In some embodiments, a separate billing engine is used to generate the transactions to settle the fees, charges and/or divide revenues.

In one embodiment, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In one embodiment, the issuer processor (145) is to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. In one embodiment, the funds are transferred electronically.

In one embodiment, the transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records (301), such as merchant category (306), transaction date (303), amount (304), etc. Examples and techniques in one embodiment are provided in U.S. patent application Ser. No. 11/378,215, filed Mar. 16, 2006, assigned Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned Pub. No. 2009/0048884, and entitled "Merchant Benchmarking Tool," U.S. patent application Ser. No. 12/940,562, filed Nov. 5, 2010, and U.S. patent application Ser. No. 12/940,664, filed Nov. 5, 2010, the disclosures of which applications are hereby incorporated herein by reference.

Transaction Terminal

FIG. 5 illustrates a transaction terminal according to one embodiment. In FIG. 5, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 5. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 5. For example, in one embodiment, the transaction terminal (105) is an ATM machine, which includes components to dispense cash under certain conditions.

Account Identification Device

FIG. 6 illustrates an account identifying device according to one embodiment. In FIG. 6, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 6, such as a cellular communications subsystem.

In one embodiment, the communication device (159) may access the account information (142) stored on the memory (167) without going through the processor (151).

In one embodiment, the account identification device (141) has fewer components than those illustrated in FIG. 6. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 7, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the modules or components illustrated in FIGS. 1 and 4, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the modules or components illustrated in FIGS. 1 and 4, such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system illustrated in FIG. 7, with more or fewer components. Some of the modules may share hardware or be combined on a computer system. In one embodiment, a network of computers can be used to implement one or more of the modules.

Further, the data illustrated in FIG. 1, such as transaction data (109), account data (111), transaction profiles (127), and advertisement data (135), can be stored in storage devices of one or more computers accessible to the corresponding modules illustrated in FIG. 1. For example, the transaction data (109) can be stored in the data warehouse (149) that can be implemented as a data processing system illustrated in FIG. 7, with more or fewer components.

In one embodiment, the transaction handler (103) is a payment processing system, or a payment card processor, such as a card processor for credit cards, debit cards, etc.

FIG. 7 illustrates a data processing system according to one embodiment. While FIG. 7 illustrates various components of a computer system, it is not intended to represent any particular architecture or manner of interconnecting the components. One embodiment may use other systems that have fewer or more components than those shown in FIG. 7.

In FIG. 7, the data processing system (170) includes an inter-connect (171) (e.g., bus and system core logic), which interconnects a microprocessor(s) (173) and memory (167). The microprocessor (173) is coupled to cache memory (179) in the example of FIG. 7.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

OTHER ASPECTS

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method, comprising:

receiving, in a computing apparatus comprising a portal, first data identifying a merchant, the first data including a first merchant identifier of the merchant, wherein the portal is configured to communicate with a remote computing device over a communication network to receive the first data, the computing apparatus having at least one processor and memory storing instructions configured to instruct the at least one processor to perform the method, and the computing apparatus further comprising a transaction handler;

determining, by the transaction handler of the computing apparatus using the first data, a second merchant identifier different from the first merchant identifier, the second merchant identifier configured to identify the merchant in authorization requests for transactions of the merchant submitted to the transaction handler, wherein the computing apparatus further comprises a data warehouse coupled with the transaction handler to store transaction data recording transactions processed by the transaction handler;

storing, in the data warehouse of the computing apparatus, second data associating the first merchant identifier and the second merchant identifier;

monitoring, by the computing apparatus using the second merchant identifier, transactions of the merchant to detect a subset of the transactions, wherein the computing apparatus further comprises a media controller; and in response to detecting a transaction in the subset, transmitting by the media controller of the computing apparatus a message to the remote computing device in real time as the transaction handler processes the transaction, wherein the message contains information about the transaction and identifies the merchant using the first merchant identifier.

2. The method of claim 1, further comprising:

determining, using the second data, the first merchant identifier for the transaction, after the detecting of the transaction in the subset.

3. The method of claim 1, wherein the receiving the first data identifying the merchant comprising:
receiving a request associated with the merchant;
computing a transaction amount configured to uniquely identify the merchant among a plurality of merchants in transactions to be made in a predetermined account; and
providing the transaction amount as a response to the request.

4. The method of claim 3, wherein the request includes the first merchant identifier of the merchant.

5. The method of claim 4, further comprising:
after the providing of the transaction amount as the response to the request, monitoring transactions in the predetermined account to detect a first transaction in the predetermined account by matching a transaction amount of the first transaction with the transaction amount provided as a response to the request; and
determining the second merchant identifier based on the first transaction;
wherein the first transaction is made in the predetermined account in accordance with the transaction amount that is provided as a response to the request.

6. The method of claim 5, further comprising:
storing a trigger record for the predetermined account to monitor transactions in the predetermined account in real time as authorization requests for transactions in the predetermined account are processed by the transaction handler.

7. The method of claim 5, further comprising:
storing third data identifying transaction amounts that have been assigned to represent different merchant identifiers including the first merchant identifier, each of the transaction amounts uniquely identifying a respective one of the different merchant identifiers of the plurality of merchants; and
after the detection of the first transaction, removing from the third data association between the first merchant identifier and the transaction amount that is provided as a response to the request.

8. The method of claim 1, further comprising:
enrolling, by the computing apparatus, a plurality of account holders, wherein the transactions in the subset are detected based at least in part on account numbers of the account holders.

9. The method of claim 8, wherein the first data identifying the merchant includes:
the first merchant identifier of the merchant; and
information about a first transaction of the merchant performed using a predetermined account number and processed via the transaction handler.

10. The method of claim 9, wherein the determining of the second merchant identifier includes:
identifying a transaction record of the first transaction based on matching data contained in the transaction record with the information about the first transaction provided in the first data; and
determining the second merchant identifier based on the transaction record.

11. The method of claim 10, wherein the information provided in the first data about the first transaction includes at least one of:
a date of the first transaction;
a time of the first transaction; and
a transaction amount of the first transaction.

12. The method of claim 1, further comprising:
storing, in a database, merchant information including merchant names and addresses associated with merchant identifiers configured to be used in authorization requests submitted to the transaction handler;
wherein the second merchant identifier is determined via matching, between the first data and the database, at least one of: a name of the merchant and an address of the merchant.

13. A non-transitory computer-storage medium storing instructions configured to instruct a computing apparatus to perform a method, the method comprising:
receiving, in the computing apparatus comprising a portal, first data identifying a merchant, the first data including a first merchant identifier of the merchant, wherein the portal is configured to communicate with a remote computing device over a communication network to receive the first data, and the computing apparatus further comprising a transaction handler;
determining, by the transaction handler of the computing apparatus using the first data identifying the merchant, a second merchant identifier different from the first merchant identifier, the second merchant identifier configured to identify the merchant in authorization requests for transactions of the merchant submitted to the transaction handler, wherein the computing apparatus further comprises a data warehouse coupled with the transaction handler to store transaction data recording transactions processed by the transaction handler;
storing, in the data warehouse of the computing apparatus, second data associating the first merchant identifier and the second merchant identifier;
monitoring, by the computing apparatus using the second merchant identifier, transactions of the merchant to detect a subset of the transactions, wherein the computing apparatus further comprises a media controller; and
in response to detecting a transaction in the subset, transmitting by the media controller of the computing apparatus a message to the remote computing device in real time as the transaction handler processes the transaction, wherein the message contains information about the transaction and identifies the merchant using the first merchant identifier.

14. A computing apparatus having at least one processor and memory storing instructions configured to instruct the at least one processor to perform operations, the computing apparatus comprising:
a portal configured to communicate with a remote computing device over a communication network to receive first data identifying a merchant, the first data including a first merchant identifier of the merchant;
a transaction handler configured to use a second merchant identifier to identify the merchant in authorization requests for transactions of the merchant submitted to the transaction handler, wherein the portal is coupled with the transaction handler to determine, using the first data identifying the merchant, the second merchant identifier different from the first merchant identifier;
a data warehouse configured to store transaction data recording transactions processed by the transaction handler and store second data associating the first merchant identifier and the second merchant identifier, wherein the transaction handler is configured to monitor, using the second merchant identifier, transactions of the merchant to detect a subset of the transactions; and
a media controller configured to transmit, in response to detecting a transaction in the subset, a message to the remote computing device in real time as the transaction handler processes the transaction, wherein the message contains information about the transaction and identifies the merchant using the first merchant identifier.

15. The computing apparatus of claim 14, wherein the data warehouse is configured to store third data associating a plurality of suggested transaction amounts with a plurality of different merchant identifiers respectively, each of the plurality of suggested transaction amounts uniquely identifying a corresponding merchant identifier in the plurality of different merchant identifiers.

16. The computing apparatus of claim 15, wherein the portal is configured to provide a suggested transaction amount, configured to uniquely identify the first merchant identifier in the plurality of different merchant identifiers in the third data, to the remote computing device in response to the first data.

17. The computing apparatus of claim 16, wherein, after the portal provides the suggested transaction amount to the remote computing device, the transaction handler is configured to detect an authorization request for a first transaction, made according to the suggested transaction amount, in a predetermined account using a transaction terminal of the merchant; wherein the second merchant identifier is determined from the authorization request.

18. The computing apparatus of claim 14, wherein the message is communicated via a communication channel separate from a communication channel used to process authorization of the transaction.

19. The computing apparatus of claim 18, wherein the message is communicated to a computing device not involved in authorization of the transaction; and wherein the computing device receiving the message is configured to identify the merchant using the first merchant identifier, after the merchant is enrolled in a program hosted on the computing device.

20. The computing apparatus of claim 14, wherein to receive the first data identifying the merchant, the portal is configured to receive a request having the first merchant identifier of the merchant, compute a transaction amount configured to uniquely identify the merchant among a plurality of merchants in transactions to be made in a predetermined account, and providing the transaction amount as a response to the request.

21. The computing apparatus of claim 14, wherein the first data identifying the merchant includes:
the first merchant identifier of the merchant; and
information about a first transaction of the merchant performed using a predetermined account number and processed via the transaction handler.

22. The computing apparatus of claim 21, wherein to determine of the second merchant identifier, the computing apparatus is configured to identify a transaction record of the first transaction based on matching data contained in the transaction record with the information about the first transaction provided in the first data and determine the second merchant identifier based on the transaction record.

23. The computing apparatus of claim 22, wherein the information provided in the first data about the first transaction includes at least one of:
a date of the first transaction;
a time of the first transaction; and
a transaction amount of the first transaction.

24. The computing apparatus of claim 21, wherein the information about the first transaction includes a location of the merchant at which the first transaction occurs, and an identifier used by a merchant aggregator to identify an account holder of the first transaction.

25. The computing apparatus of claim 24, wherein an issuer is configured to make a payment for the first transaction on behalf of the account holder; and an acquirer is configured to receive the payment on behalf of the merchant.

* * * * *